United States Patent
Kodama et al.

(10) Patent No.: US 11,301,133 B2
(45) Date of Patent: Apr. 12, 2022

(54) ANALYSIS DEVICE, NON-TRANSITORY COMPUTER-READABLE STORAGE MEDIUM FOR ANALYSIS PROGRAM, AND COMPUTER SYSTEM

(71) Applicant: FUJITSU LIMITED, Kawasaki (JP)

(72) Inventors: Hiroyoshi Kodama, Isehara (JP); Satoshi Kazama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/072,072

(22) Filed: Oct. 16, 2020

(65) Prior Publication Data
US 2021/0173565 A1 Jun. 10, 2021

(30) Foreign Application Priority Data
Dec. 9, 2019 (JP) .............................. JP2019-222539

(51) Int. Cl.
*G06F 12/00* (2006.01)
*G06F 3/06* (2006.01)

(52) U.S. Cl.
CPC ............ *G06F 3/0607* (2013.01); *G06F 3/068* (2013.01); *G06F 3/0629* (2013.01); *G06F 3/0653* (2013.01)

(58) Field of Classification Search
CPC .... G06F 3/0607; G06F 3/0629; G06F 3/0653; G06F 3/068
See application file for complete search history.

(56) References Cited

U.S. PATENT DOCUMENTS

| | | | |
|---|---|---|---|
| 10,713,164 B1 * | 7/2020 | Sahin | G06F 12/0864 |
| 2003/0169269 A1 | 9/2003 | Sasaki et al. | |
| 2010/0325367 A1 * | 12/2010 | Kornegay | G06F 12/0804 711/143 |
| 2011/0040725 A1 | 2/2011 | Sugimoto | |

FOREIGN PATENT DOCUMENTS

| | | |
|---|---|---|
| JP | 2005-520234 A | 7/2005 |
| JP | 2008-139965 A | 6/2008 |
| JP | 2011-039800 A | 2/2011 |

* cited by examiner

*Primary Examiner* — Gurtej Bansal
(74) *Attorney, Agent, or Firm* — Fujitsu Patent Center

(57) ABSTRACT

An analysis device configured to be connected to an information processing apparatus configured to mount a first memory and a low-speed second memory, the low-speed second memory being cheaper and having lower performance than the first memory and being used for memory capacity expansion, the analysis device being configured to perform program instructions including: causing the information processing apparatus to execute a plurality of types of performance evaluation application programs and acquire memory performance characteristic information regarding each performance evaluation application program from the information processing apparatus; determining a recommended memory configuration according to the performance evaluation application program corresponding to the application to be evaluated program among the plurality of types of performance evaluation application programs by using a collection result of the memory performance characteristic information; and outputting recommended memory configuration information indicating the recommended memory configuration to an output destination.

8 Claims, 30 Drawing Sheets

FIG. 10

| DRAM (GB) | NUMBER OF DRAMS (NUMBER) | MAXIMUM CAPACITY (GB) | MEMORY RESERVATION AMOUNT | MAXIMUM BAND (GB/sec) | MEMORY ACCESS AMOUNT (GB/sec) | COST | COST |
|---|---|---|---|---|---|---|---|
| 128 | 12 | 1536 | 921.6 | 240 | 24 | X0 | 100 |

FIG. 11

| DCPMM | NUMBER OF DCPMMS (NUMBER) | DRAM | NUMBER OF DRAMS (NUMBER) | COST | | | |
|---|---|---|---|---|---|---|---|
| | | | | DRAM | DCPMM | TOTAL | |
| 128GB | 8 | 8GB | 8 | x1 | x2 | X1 | 10% |
| 256GB | 4 | 8GB | 4 | x3 | x4 | X2 | 15% |
| 512GB | 2 | 8GB | 2 | x5 | x6 | X3 | 25% |

| DRAM | PERFORMANCE | COST | PERFORMANCE RATIO |
|---|---|---|---|
| 16*8 | 654 | 100% | 100% |
| 16*4 | 913 | 50% | 72% |
| 16*2 | 1651 | 33% | 40% |

FIG. 15

| DRAM | DCPMM | PERFORMANCE | PERFORMANCE RATIO | COST RATIO |
|---|---|---|---|---|
| 16*8 | 256*4 | 666 | 98% | 320% |
| 16*4 | 256*4 | 939 | 70% | 270% |
| 16*2 | 256*2 | 2018 | 32% | 135% |

FIG. 18

| DRAM | PERFORMANCE | PERFORMANCE RATIO | COST | CONSIDERABLE PERFORMANCE DEGRADATION PROBABILITY |
|---|---|---|---|---|
| 128*12 | 441 | 100% | 100% | 0% |
| 128*6 | 533 | 83% | 50% | 30% |
| 128*4 | 2295 | 19% | 33% | 100% |

FIG. 19

| DRAM | DCPMM | PERFORMANCE | COST | CONSIDERABLE PERFORMANCE DEGRADATION PROBABILITY |
|---|---|---|---|---|
| 128*12 | 256*4 | 96% | 113% | 0% |
| 128*6 | 256*4 | 78% | 63% | 0% |
| 128*4 | 256*4 | 51% | 47% | 0% |

FIG. 20

| DRAM (GB) | NUMBER OF DRAMS (NUMBER) | MAXIMUM CAPACITY (GB) | RESERVED CAPACITY | MAXIMUM BAND (GB/sec) | ACCESS AMOUNT (GB/sec) | COST | |
|---|---|---|---|---|---|---|---|
| 128 | 8 | 1024 | 921.6 | 240 | 24 | X4 | 67% |

ANALYSIS DEVICE, NON-TRANSITORY COMPUTER-READABLE STORAGE MEDIUM FOR ANALYSIS PROGRAM, AND COMPUTER SYSTEM

CROSS-REFERENCE TO RELATED APPLICATION

This application is based upon and claims the benefit of priority of the prior Japanese Patent Application No. 2019-222539, filed on Dec. 9, 2019, the entire contents of which are incorporated herein by reference.

FIELD

The embodiment discussed herein is related to an analysis device, a non-transitory computer-readable storage medium storing an analysis program, and a computer system.

BACKGROUND

In a case of building an on-premise (hereinafter sometimes referred to as "on-premise") server, selecting a device of an infrastructure as a service (IaaS), or the like, it is desirable to determine a hardware configuration optimum for an application to be executed. System designers decide the hardware configuration on the basis of technical knowledge of system engineers (SEs) and benchmark results.

Furthermore, in recent years, new architectures (separation by each function) have been created, and types of hardware are increasing.

Regarding memories, data center persistent memory modules (DCPMM) that are cheap, has a large capacity, and has performance comparable to that of dynamic random access memories (DRAMs) have appeared. The DCPMM has enabled determination of a hardware configuration considering not only performance but also cost.

In terms of performance, the DCPMM is slower than the DRAM but is faster than a solid state drive (SSD). Furthermore, in terms of cost, the DCPMM is cheaper than the DRAM but is more expensive than the solid state drive (SSD).

Here, there are a memory mode and an App direct mode as operation modes of the DCPMM.

In the App direct mode, the DCPMM can be used as a persistent memory or storage. Note that, in the case of using the DCPMM as the persistent memory, using a direct access mode (DAX), an application needs to be modified.

Meanwhile, in the memory mode of the DCPMM, the DRAM is used as a cache, and only the DCPMM can be seen from an operating system (OS). Note that, in the case of using the DCPMM in the memory mode, simultaneous installation of the DRAM is essential. Furthermore, in the case of using the DCPMM in the memory mode, there is no need to change the application.

Examples of the related art include Japanese Laid-open Patent Publication No. 2008-139965, Japanese Laid-open Patent Publication No. 2011-39800, and Japanese National Publication of International patent Application No. 2005-520234.

SUMMARY

According to an aspect of the embodiments, described is an analysis device configured to be connected to an information processing apparatus in a communicative manner, the information processing apparatus being configured to mount a first memory and a low-speed second memory, the low-speed second memory being cheaper and having lower performance than the first memory and being used for memory capacity expansion. In an example, the analysis device includes: a memory; and a processor coupled to the memory, the processor being configured to perform program instructions, the program instructions including: causing the information processing apparatus to execute a plurality of types of performance evaluation application programs and acquire memory performance characteristic information regarding each performance evaluation application program from the information processing apparatus; determining a recommended memory configuration according to the performance evaluation application program corresponding to the application to be evaluated program among the plurality of types of performance evaluation application programs by using a collection result of the memory performance characteristic information; and outputting recommended memory configuration information indicating the recommended memory configuration to an output destination.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 is a diagram illustrating a pre-change configuration in the computer system as an example of an embodiment;

FIG. 11 is a diagram illustrating recommended memory configurations in the computer system as an example of an embodiment;

FIG. 14 is a diagram illustrating memory performance characteristic information in the computer to be examined of the computer system as an example of an embodiment;

FIG. 15 is a diagram illustrating memory performance characteristic information in the computer to be examined of the computer system as an example of an embodiment;

FIG. 18 is a diagram illustrating memory performance characteristic information in the computer to be examined of the computer system as an example of an embodiment;

FIG. 19 is a diagram illustrating memory performance characteristic information in the computer to be examined of the computer system as an example of an embodiment;

FIG. 20 is a diagram illustrating a recommended memory configuration in the computer system as an example of an embodiment;

DESCRIPTION OF EMBODIMENT(S)

Figure 1:
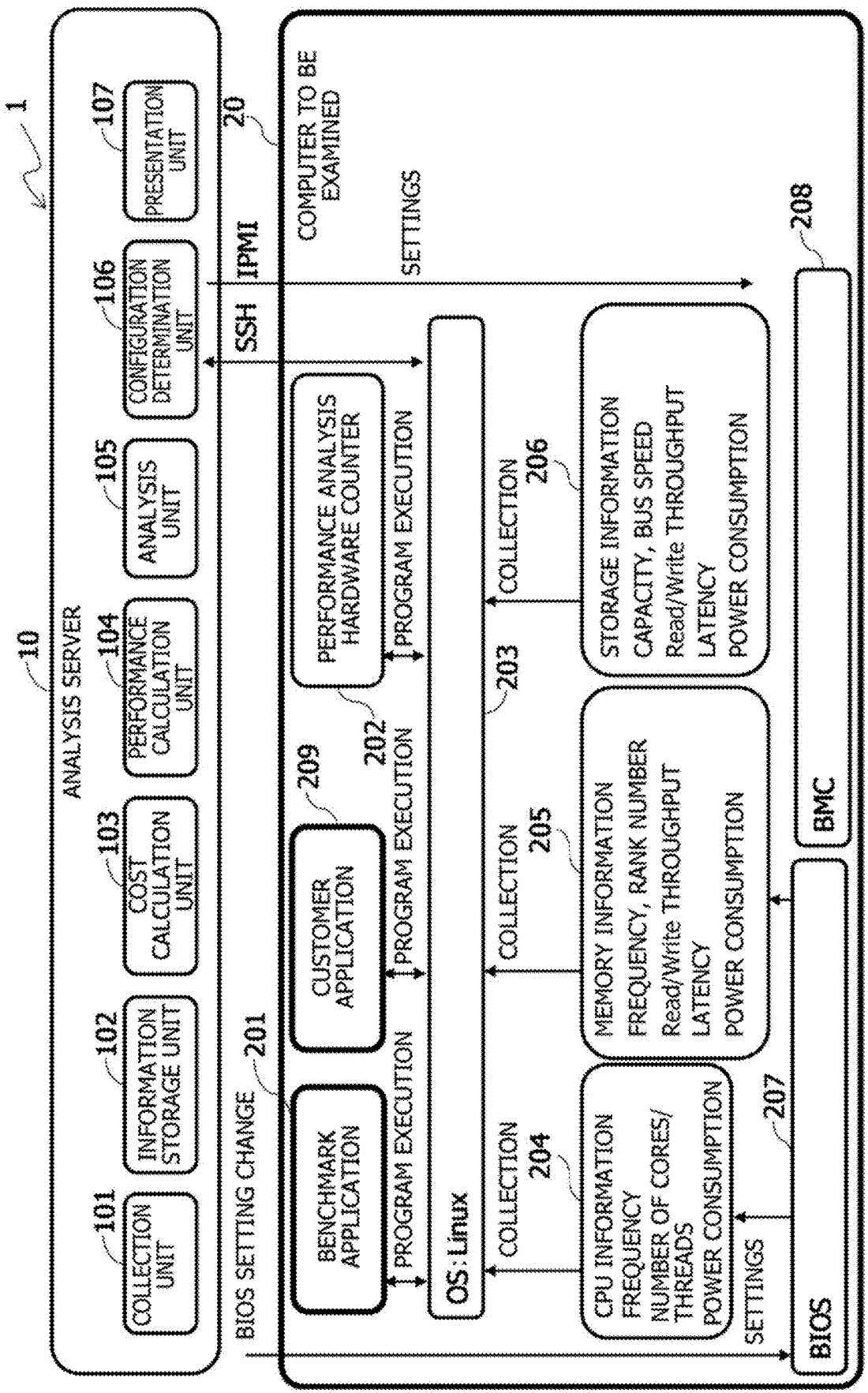
FIG. 1 is a diagram schematically illustrating a configuration of a computer system as an example of an embodiment.

As described above, the memory mode of the DCPMM is highly versatile because the memory mode can be used without changing the application. However, there are various applications used by customers, and the DCPMM is not necessarily suitable for all of these applications. For example, it is better to use the DRAM having a faster access speed than the DCPMM for execution of an application with a large memory access amount. Meanwhile, by providing the DCPMM instead of the DRAM, the device cost can be reduced.

In an aspect of the embodiments, provided is a solution to acquire a memory configuration suitable for an application executed in an information processing apparatus that functions in a memory mode.

Hereinafter, an embodiment of an analysis device, an analysis program, and a computer system will be described with reference to the drawings. Note that the embodiment to be described below is merely an example, and there is no intention to exclude application of various modifications and techniques not explicitly illustrated in the embodiment. That is, the present embodiment can be variously modified (by combining the embodiment and respective modifications, for example) without departing from the spirit of the present embodiment. Furthermore, each drawing is not intended to include only constituent elements illustrated in the drawing and can include other functions and the like.

(A) Configuration

FIG. 1 is a diagram schematically illustrating a configuration of a computer system 1 as an example of an embodiment.

As illustrated in FIG. 1, the computer system 1 includes an analysis server 10 and a computer to be examined 20. The analysis server 10 examines a hardware configuration of the computer to be examined 20. In the present embodiment, the analysis server 10 examines a memory configuration of the computer to be examined 20 and proposes a memory configuration suitable for the computer to be examined 20 to a user of the computer to be examined 20, for example. The user of the computer to be examined 20 may be, for example, a system designer or a system administrator.

[Computer to be Examined 20]

The computer to be examined 20 is, for example, a computer (information processing apparatus) having a server function, and includes a central processing unit (CPU) 201 (see FIG. 2), a memory, and a storage device.

The computer to be examined 20 is, for example, a computer used by the user for business or the like, and executes an application (customer application) 209 used for the business. The customer application 209 may be called application to be evaluated.

The CPU is a processing device that performs various controls and calculations, and implements various functions by executing an OS and applications stored in the memory.

The memory is a storage memory such as a read only memory (ROM) and a random access memory (RAM). An application program (hereinafter also simply referred to as an application) and data for the application are written in the ROM of the memory. The application on the memory is appropriately read and executed by the CPU. Furthermore, the RAM of the memory is used as a primary storage memory or a working memory. In the present computer system 1, the configuration of the RAM is examined.

Figure 2:
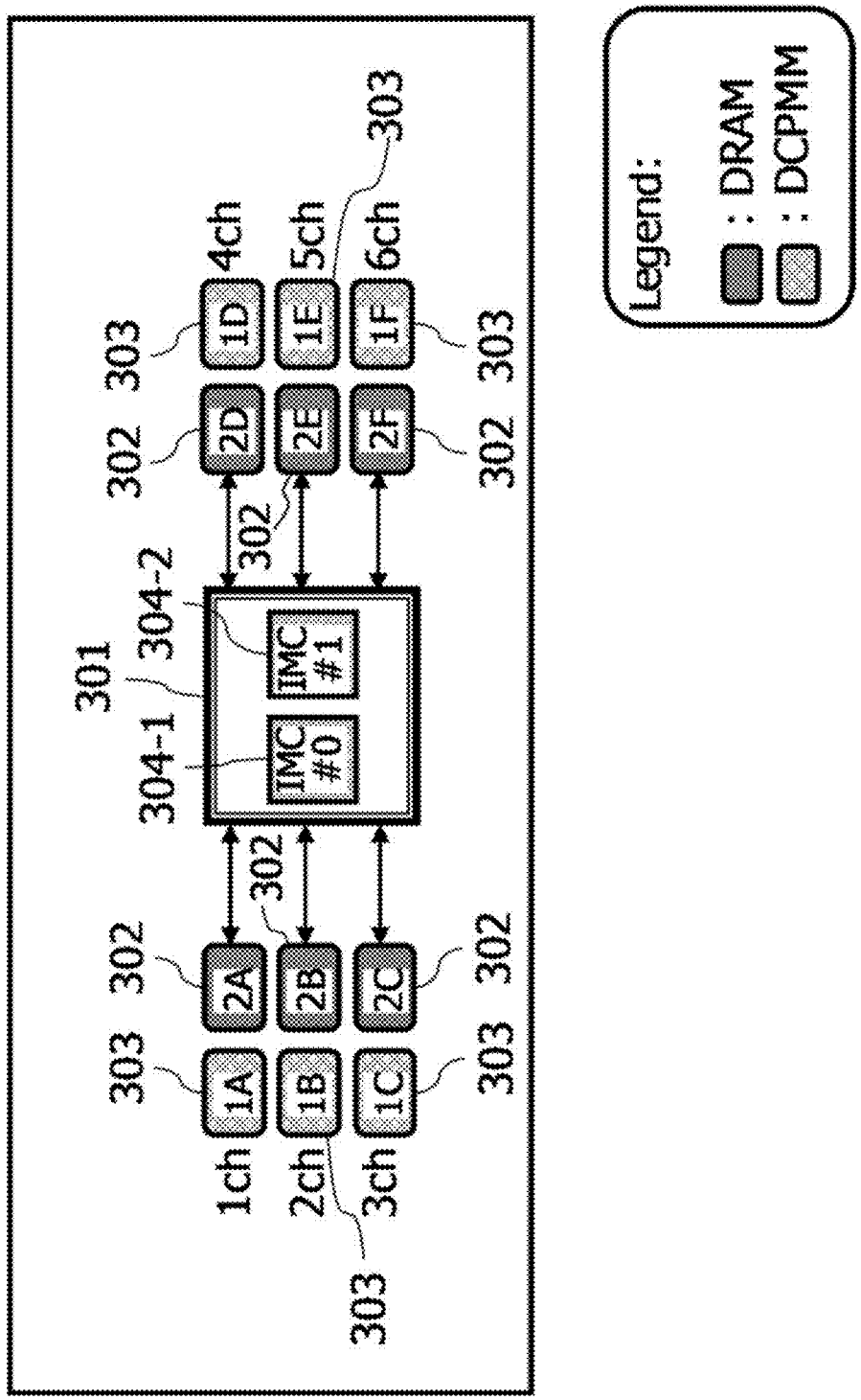
FIG. 2 is a diagram illustrating a configuration of a memory slot of a computer to be examined in the computer system as an example of an embodiment.

FIG. 2 is a diagram illustrating a configuration of a memory slot of the computer to be examined 20 in the computer system 1 as an example of an embodiment.

A CPU 301 includes one or more (two in the example illustrated in FIG. 2) integrated memory controllers (IMCs) 304-1 and 304-2. One or more (three in the present embodiment) channels (chs) are connected to each of the IMCs 304-1 and 304-2. Furthermore, a DRAM slot 302 and a DCPMM slot 303 are connected to each channel. A DRAM (first memory) is attached to the DRAM slot 302, and a DCPMM (second memory) is attached to the DCPMM slot 303, respectively.

In the example illustrated in FIG. 2, 1ch to 3ch are connected to the IMC 304-1, and 4ch to 6ch are connected to the IMC 304-2, respectively.

Note that the DRAM slot 302 and the DCPMM slot 303 connected to 1ch are represented by reference signs 2A and 1A, respectively. Similarly, the DRAM slot 302 and the DCPMM slot 303 connected to 2ch are represented by reference signs 2B and 1B, respectively, and the DRAM slot 302 and the DCPMM slot 303 connected to 3ch are represented by reference signs 2C and 1C, respectively. Furthermore, the DRAM slot 302 and the DCPMM slot 303 connected to 4ch are represented by reference signs 2D and 1D, respectively, and the DRAM slot 302 and the DCPMM slot 303 connected to 5ch are represented by reference signs 2E and 1E, respectively. Moreover, the DRAM slot 302 and the DCPMM slot 303 connected to 6ch are represented by reference signs 2F and 1F, respectively.

Hereinafter, in a case where the IMCs 304-1 and 304-2 are not particularly distinguished, they are written as IMC(s) 304. Furthermore, the IMC 304-1 may be written as IMC #0, and the IMC 304-2 may be written as IMC #1. IMC #0 is given priority over IMC #1.

A maximum of one DRAM and a maximum of one DCPMM are attached to each channel. Furthermore, each DCPMMs having the same capacity are attached to the DCPMM slots 303. In each channel, the DCPMM slot 303 is located near the CPU 301 and the DRAM slot 302 is located far from the CPU 301. Note that only the IMC #0 may be used and the IMC #1 may be empty.

Furthermore, in a case of using a DCPMM in a memory mode, requirement as a minimum configuration is to include one DRAM and one DCPMM per IMC 304. Furthermore, a bandwidth is maximized by mounting a DRAM and a DCPMM on all the channels.

Then, in the present computer system 1, the computer to be examined 20 uses a DCPMM in the memory mode. That is, in the computer to be examined 20, the DRAM (first memory) is used as a cache memory and the DCPMM (second memory) is used as a memory. Thereby, this allows an OS to recognize the capacity of the DCPMM as a memory capacity. That is, in the computer to be examined 20, expansion of the memory capacity is implemented using the DCPMM.

The computer to be examined 20 executes one or more applications on an operating system (OS) 203. Linux (registered trademark) may be used as the OS 203, for example.

The OS 203 has a function to collect CPU information 204, memory information 205, and storage information 206. The CPU information 204 is information regarding the CPU 301, and is, for example, frequency, the number of cores, the number of threads, and power consumption. The memory information 205 is information regarding the memory, and is, for example, frequency, rank number, read/write throughput, latency, and power consumption. The OS 203 can acquire the CPU information 204 and the memory information 205 using various known methods. Furthermore, configuration information of the memory may be set via, for example, a basic input output system (BIOS) 207.

The storage information 206 is information regarding a storage (storage device) (not illustrated) included in the computer to be examined 20, and is, for example, capacity, bus speed, read/write throughput, latency, and power consumption. The OS 203 can acquire such storage information 206 using various known methods. For example, the OS 203 may acquire the storage information 206 from the storage or by measurement.

In the computer to be examined 20, the CPU 301 executes a benchmark application 201. The benchmark application 201 is, for example, a performance evaluation (benchmark) application used for evaluating performance of the computer system. In the present embodiment, SPEC CPU 2017 is used as the benchmark application 201. SPEC is an abbreviation for Standard Performance Evaluation Corporation.

The benchmark application 201 includes a plurality of types of execution application programs. In the present embodiment, 500.perlbench_r, 502.gcc_r, 505.mcf_r, 520.omnetpp_r, 523.xalancbmk_r, 525.x264_r, 531.deep-sjeng_r, 541.leela_r, 548.exchange2_r, and 557.xz_r, which are used for integer benchmark, are used as the execution application programs, among a plurality of application programs included in SPEC CPU 2017.

Furthermore, in the computer to be examined 20, a performance analysis hardware counter 202 is executed. The performance analysis hardware counter 202 is a performance analysis tool (performance analysis program) that analyzes the performance of the information processing apparatus (the computer to be examined 20 in the present embodiment) that executes the performance analysis hardware counter 202. As the performance analysis hardware counter 202, for example, performance analysis tools for Linux (perf) may be used.

The performance analysis hardware counter 202 measures a memory reservation amount and a memory access amount (a read throughput and a write throughput) for each of a plurality of execution programs of the benchmark application 201 executed in the computer to be examined 20. The performance analysis hardware counter 202 may be called performance counter.

The memory reservation amount indicates the size (memory capacity) of a storage area in the memory reserved by the execution program for its own execution. The memory access amount indicates the amount of data access to the memory when the execution program is executed. The memory access amount includes transition of the memory access amount over time. That is, the performance analysis hardware counter 202 can also measure a variation in the memory access amount.

Furthermore, the computer to be examined 20 includes the BIOS 207. The configuration (hardware configuration) of the computer to be examined 20 can be changed by changing a setting value (parameter) of the BIOS 207. For example, the DRAM slot 302 or the DCPMM slot 303 of a specific channel can be arbitrarily enabled/disabled by changing the settings regarding the memory of the BIOS 207, so that the memory configuration of the computer to be examined 20 can be arbitrarily changed.

Then, a collection unit 101 of the analysis server 10 to be described below changes the settings of the BIOS 207 using a remote control function, whereby the memory configuration of the computer to be examined 20 can be arbitrarily changed.

The remote control function may be implemented using, for example, an intelligent platform management interface (IPMI). The analysis server 10 (collection unit 101) may change the memory configuration of the computer to be examined 20 by posting an extensible markup language (XML) statement in which setting information regarding the memory is described to a BMC 208 of the computer to be examined 20 via the IPMI, for example.

The remote control function may change the memory configuration of the computer 20 by, for example, rewriting the settings of the BIOS using a dedicated program that accesses the BIOS.

Furthermore, the analysis server 10 (collection unit 101) may change the memory configuration of the computer to be examined 20 by emulating, for example, an operation screen (BIOS screen) of the BIOS 207 of the computer to be examined 20 and changing Enable to Disable or Disable to Enable in a memory configuration menu.

Note that the analysis server 10 may change the memory configuration of the computer to be examined 20 using another method such as using a dedicated tool.

Furthermore, the computer to be examined 20 includes the baseboard management controller (BMC) 208. The BMC 208 is a monitor and control device that monitors and maintains the computer to be examined 20. The BMC 208 controls ON/OFF of a power supply of the computer to be examined 20. For example, the analysis server 10 (collection unit 101) may control ON/OFF of the power supply of the computer to be examined 20 by accessing the BMC 208 via the intelligent platform management interface (IPMI).

[Analysis Server 10]

The analysis server 10 is a computer (information processing apparatus) having a server function, and has a hardware configuration presentation function to analyze the computer to be examined 20 and present a hardware configuration suitable for the computer to be examined 20 on the basis of an analysis result.

As illustrated in FIG. 1, the analysis server 10 has functions as the collection unit 101, an information storage unit 102, a cost calculation unit 103, a performance calculation unit 104, an analysis unit 105, a configuration determination unit 106, and a presentation unit 107.

The collection unit 101 collects information regarding the computer to be examined 20. For example, the collection unit 101 communicates with the OS 203 of the computer to be examined 20 via a secure shell (SSH) and executes an information acquisition command to acquire the CPU information 204, the memory information 205, and the storage information 206.

Furthermore, the collection unit 101 causes the computer to be examined 20 to execute the benchmark application 201 (execution application program) and execute the performance analysis hardware counter 202 to acquire the memory performance characteristic information of the execution application program in the computer to be examined 20.

Specifically, the collection unit 101 causes the computer to be examined 20 to execute SPEC CPU 2017500.perlbench_r, 502.gcc_r, 505.mcf_r, 520.omnetpp_r, 523.xalancbmk_r, 525.x264_r, 531.deepsjeng_r, 541.leela_r, 548.exchange2_r, and 557.xz_r. Then, the collection unit 101 causes the performance analysis hardware counter 202 to acquire the memory reservation amount and the memory access amount at the time of execution of each of the execution application programs in the computer to be examined 20. The memory reservation amount and the memory access amount correspond to the performance characteristic information.

Figure 3:
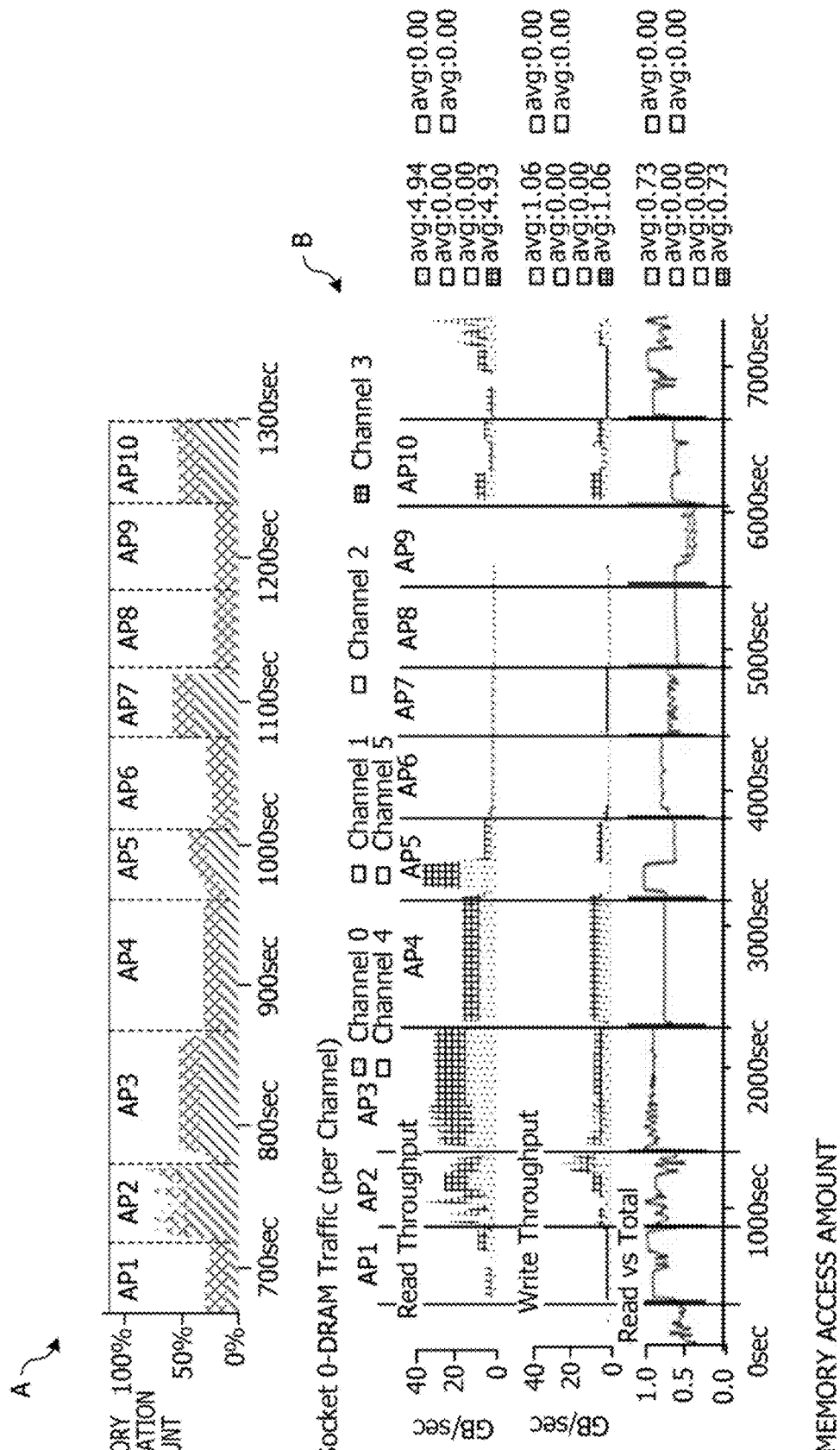
FIG. 3 is a diagram illustrating memory performance characteristic information in the computer to be examined of the computer system as an example of an embodiment.

FIG. 3 is a diagram illustrating the memory performance characteristic information in the computer to be examined 20 of the computer system 1 as an example of an embodiment. For each of ten types of execution application programs, the memory reservation amount and the memory access amount at the time of execution are illustrated as graphs.

In FIG. 3, reference sign A represents a transition of the memory reservation amount, and reference sign B represents a transition of the memory access amount. Furthermore, in FIG. 3, reference signs AP1, AP2, AP3, AP4, AP5, AP6, AP7, APB, AP9, and AP10 respectively correspond to 500.perlbench_r, 502.gcc_r, 505.mcf_r, 520.omnetpp_r, 523.xalancbmk_r, 525.x264_r, 531.deepsjeng_r, 541.leela_r, 548.exchange2_r, and 557.xz_r.

Furthermore, the memory access amount represented by the reference sign B in FIG. 3 indicates a state in which a DRAM is mounted only in the DRAM slot 302 of the channel 0 (ch0) and the channel 3 (ch3).

As illustrated in FIG. 3, the collection unit 101 causes the computer to be examined 20 to execute each execution application program and acquires the memory reservation amount and the memory access amount at the time of execution of the each execution application program. The collection unit 101 causes the performance analysis hardware counter 202 to acquire the memory reservation amount and the memory access amount at the time of execution of each execution application program in the computer to be examined 20.

Furthermore, the collection unit 101 measures memory band dependency of the computer to be examined 20. The memory band corresponds to the number of DRAM channels connected to the same CPU 301. That is, the memory band can be arbitrarily increased or decreased by increasing or decreasing the number of DRAMs (the number of channels) connected to the CPU 301 (IMC).

Figure 4:
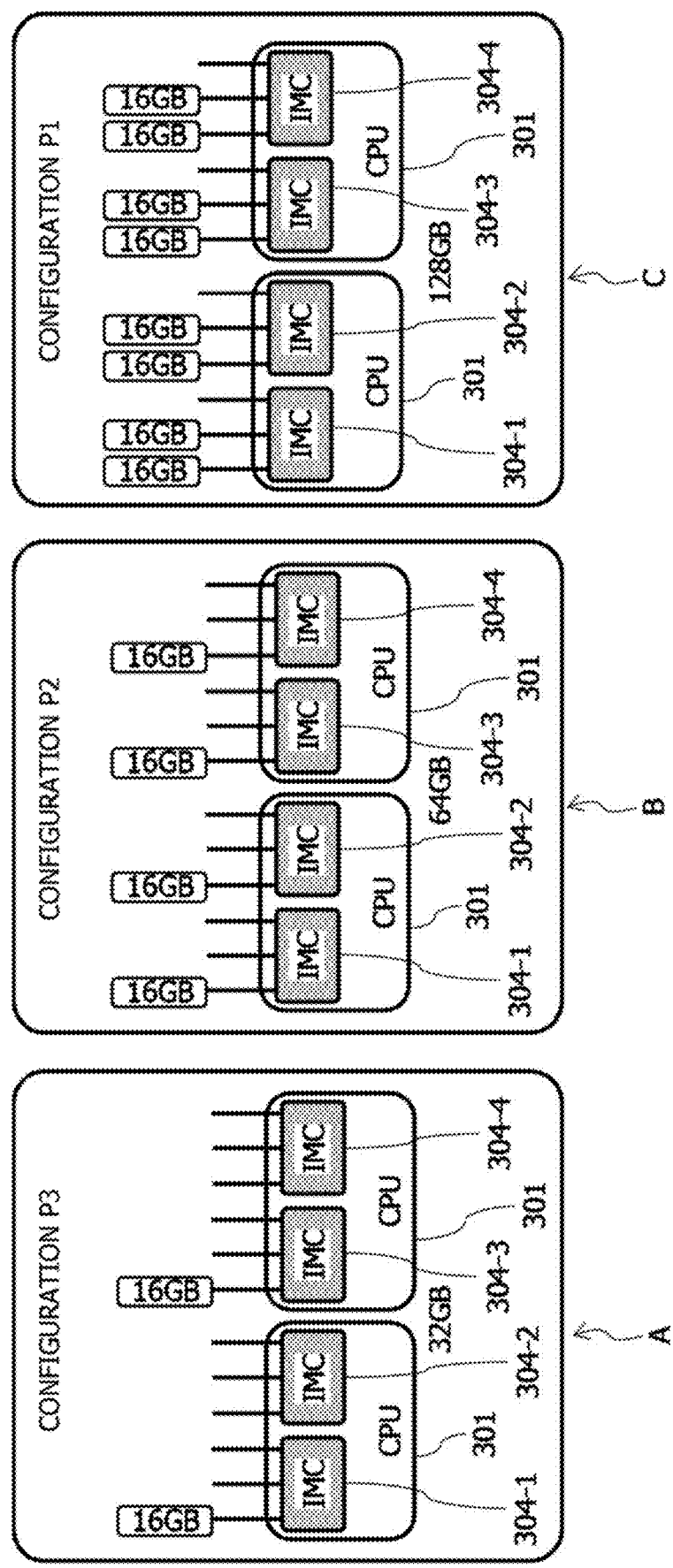
FIG. 4 is a diagram for describing a memory band.

FIG. 4 is a diagram for describing the memory band.

In FIG. 4, reference sign A represents a configuration (configuration P3) in which one DRAM is connected to each of two CPUs 301, and reference sign B represents a configuration (configuration P2) in which two DRAMs are connected to each of the two CPUs 301. Furthermore, reference sign C represents a configuration (configuration P1) in which four DRAMs are connected to each of the two CPUs 301.

In the example illustrated in FIG. 4, the memory band of the DRAM increases in order of the configuration P3, the configuration P2, the configuration P1.

The collection unit 101 changes the memory band of the computer to be examined 20 into the configurations P1, P2, and P3, and executes each execution application program in each memory band.

After completing execution of the execution application program and acquisition of the memory performance characteristic information in the configuration P3, for example, the collection unit 101 next changes the memory configuration of the computer to be examined 20 to the configuration P2. The collection unit 101 turns the power off and then on again to enable the change. Then, the collection unit 101 executes the execution application program and acquires the memory performance characteristic information in the configuration P2. Thereafter, the collection unit 101 changes the memory configuration of the computer to be examined 20 to the configuration P3, and turns the power off and then on again to enable the change. The collection unit 101 executes the execution application program and acquires the memory performance characteristic information in the configuration P3.

In this way, the collection unit 101 executes the execution application program and acquires the memory performance characteristic information in each of the configurations P1 to P3. That is, the collection unit 101 causes the performance analysis hardware counter 202 to acquire the memory reservation amount and the memory access amount at the time of execution of each execution application programs in each memory band in the computer to be examined 20.

Note that the collection unit 101 may change the memory configuration of the computer to be examined 20 using another method such as using a dedicated tool.

The collection unit 101 causes the performance analysis hardware counter 202 to acquire the memory reservation amount and the memory access amount at the time of execution of each execution application programs in each memory band in the computer to be examined 20.

Figure 5:
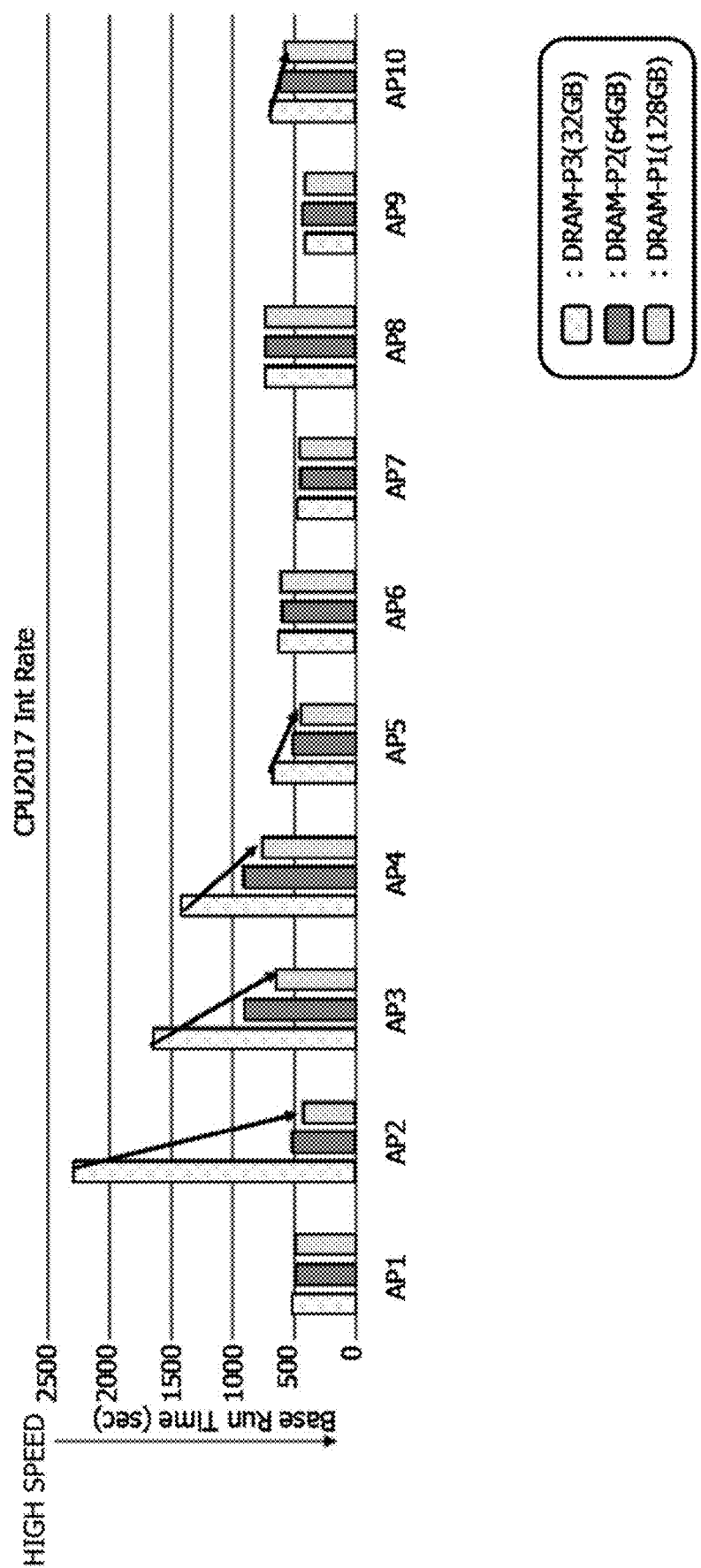
FIG. 5 is a diagram illustrating memory performance characteristic information in the computer to be examined of the computer system as an example of an embodiment.

FIG. 5 is a diagram illustrating the memory performance characteristic information in the computer to be examined 20 of the computer system 1 as an example of an embodiment. For each of the ten types of execution application programs, a change in the processing performance in the case of changing the memory band is illustrated as a bar graph.

In the example illustrated in FIG. 5, it is understood that, regarding each of the execution application programs of 502.gcc_r (AP2), 505.mcf_r (AP3), 520.omnetpp_r (AP4), 523.xalancbmk_r (AP5), and 557.xz_r (AP10), the time (base run time) for execution is shortened and speeded up (high performance) as the increase in the memory band.

Figure 6:
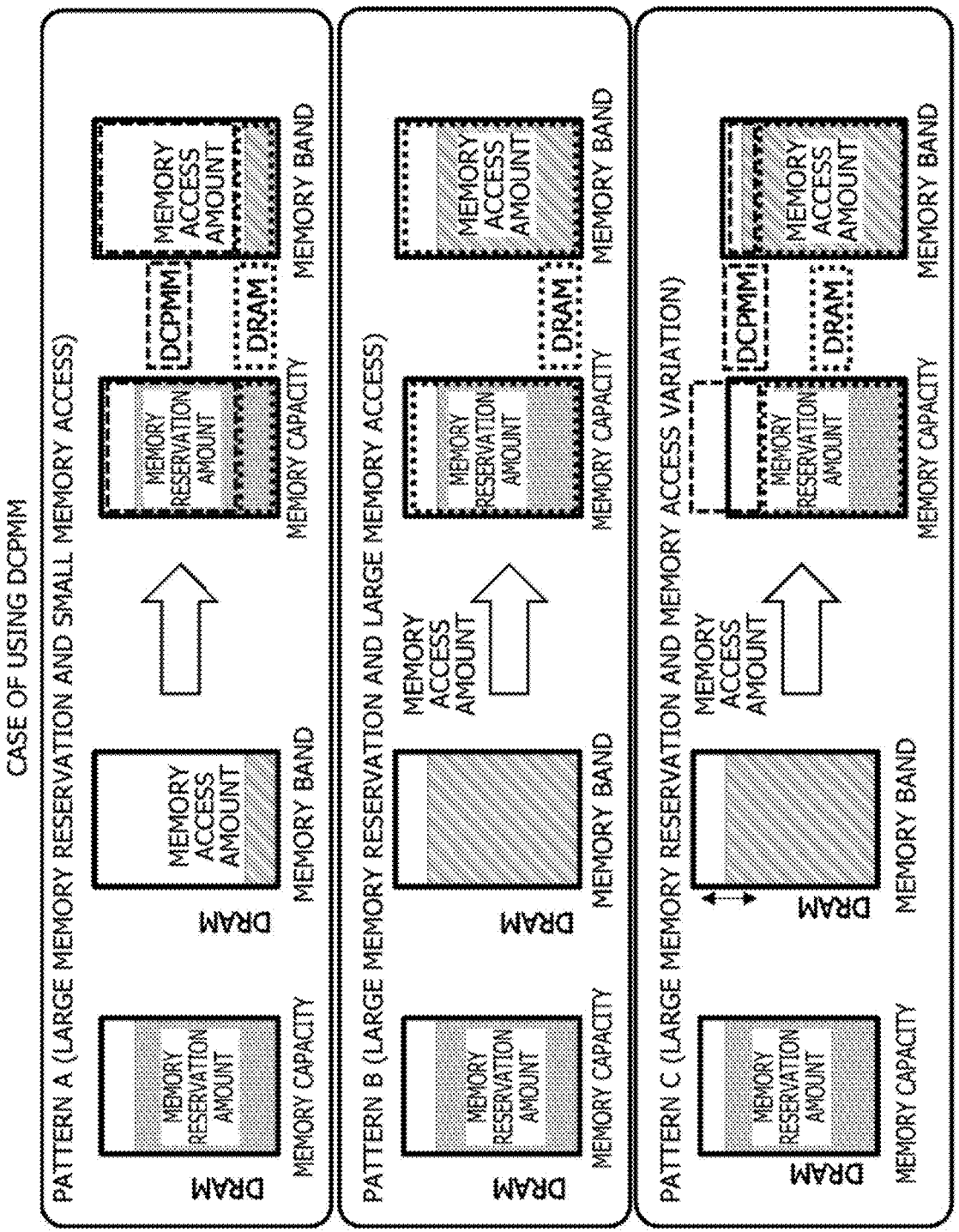
FIG. 6 is a diagram for describing a method of using a DCPMM in the computer system as an example of the embodiment.

FIG. 6 is a diagram for describing a method of using the DCPMM in the computer system 1 as an example of the embodiment.

FIG. 6 illustrates a use state of the DRAM and a method of using the DCPMM suitable for the use state of the DRAM in association with each other.

In the example illustrated in FIG. 6, the use status of the DRAM is illustrated in three patterns A, B, and C. In the example illustrated below, it is determined that the memory reservation amount is large in a case where the memory reservation amount is equal to or larger than a predetermined threshold (first threshold), and the memory reservation amount is small in a case where the memory reservation amount is less than the first threshold. The first threshold may be, for example, a ratio of the memory reservation amount to the memory capacity, and is, for example, 50%.

Furthermore, it is determined that the memory access amount is large in a case where the memory access amount is equal to or larger than a predetermined threshold (second threshold), and the memory access amount is small in a case where the memory access amount is less than the second threshold. The second threshold may be, for example, 20 GB/sec per one CPU 301. For example, in the case where two CPUs 301 are provided, 40 GB/sec may be set as the second threshold.

Note that the first threshold and the second threshold are not limited to these values and can be changed as appropriate and implemented.

Furthermore, the collection unit 101 changes the configuration of the computer to be examined 20 to have a recommended hardware configuration (recommended memory configuration) determined by the configuration determination unit 106 to be described below.

The information storage unit 102 stores (accumulates) the information collected by the collection unit 101. The information storage unit 102 is implemented by, for example, a storage area of a memory 12 or a storage device 13 (see FIG. 29).

The analysis unit 105 determines which of patterns A, B, C, and D the memory use tendency of each execution application program corresponds to on the basis of the memory reservation amount and the memory access amount for each execution application program and the change in the performance due to the change in the memory band acquired by the performance analysis hardware counter 202.

Hereinafter, the analysis unit 105 determining (analyzing) which of the patterns A to D the memory use tendency of the execution application program corresponds to may be referred to as characteristic analysis.

(Pattern A)

The pattern A is a case in which the memory reservation amount by the execution application program is large and the memory access amount is small, and moreover, the performance is not improved even if the memory band is increased. For the application in which the use status of the DRAM by the execution application program is the pattern A, it is effective to mount the DRAM of a size according to the memory access amount and to secure the memory using the DCPMM. By expanding the memory using the DCPMM, a mount amount of the DRAM is reduced and cost reduction can be realized.

(Pattern B)

The pattern B is a case in which the memory reservation amount by the execution application program is large and the memory access amount is also large, and moreover, the performance is improved when the memory band is increased.

The analysis unit 105 determines whether or not the memory access amount is large by comparing the memory access amount with a predefined predetermined threshold, for example. Here, a minimum band per DRAM may be used as the threshold. A value obtained by multiplying the minimum access band per DRAM (for example, 21.3 GB/sec in the case of DDR4-2666) by the number of CPUs (the number of CPUs×21.3 GB/sec) may be used as the threshold. For example, in the present embodiment, the number of CPUs is 2. Therefore, the minimum band is 42.6 GB/sec and this value is used as the threshold.

As described above, in the case where the use status of the DRAM by the execution application program is the pattern B, use of the DRAM is desirable in order to process the large amount of memory access at a high speed, and expansion by the DCPMM is not suitable. Therefore, it is desirable not to mount the DCPMM.

(Pattern C)

The pattern C is a case in which the memory reservation amount by the execution application program is large and varies, and the memory access amount also varies. In the case where the use status of the DRAM by the execution application program is the pattern C, and in the case where shortage of the DRAM occurs due to the variation in the memory access amount, swapping to the storage device 13 (see FIG. 29) occurs and considerable performance degradation may occur. Therefore, it is effective to mount the DRAM of a size according to the memory reservation amount and further mount the DCPMM as a swap measure. Note that the mount amount of the DRAM is desirably larger than the memory reservation amount. Furthermore, the size of the DCPMM is set such that a total size of the DRAM and the DCPMM becomes larger than the maximum value of the memory access amount.

Even in a case where a sudden increase in access occurs, provision of the DCPMM suppresses occurrence of the swapping and suppresses occurrence of the considerable performance degradation. Furthermore, in the case of the pattern C, it is desirable that the performance calculation unit 104 to be described below calculates an access performance degradation occurrence probability from a memory access variation amount.

Note that determination as to whether or not the memory reservation amount and the memory access amount vary can be implemented using various known methods, and description thereof is omitted.

(Pattern D)

The execution application program that does not correspond to any of the above patterns A to C is assumed to be the pattern D. The case where the use status of the DRAM by the execution application program is the pattern D corresponds to a case in which the memory reservation amount is small with respect to a physical memory amount, and there is no request for memory expansion. For the pattern D, the cost reduction can be realized by reducing the DRAM.

Figure 7:
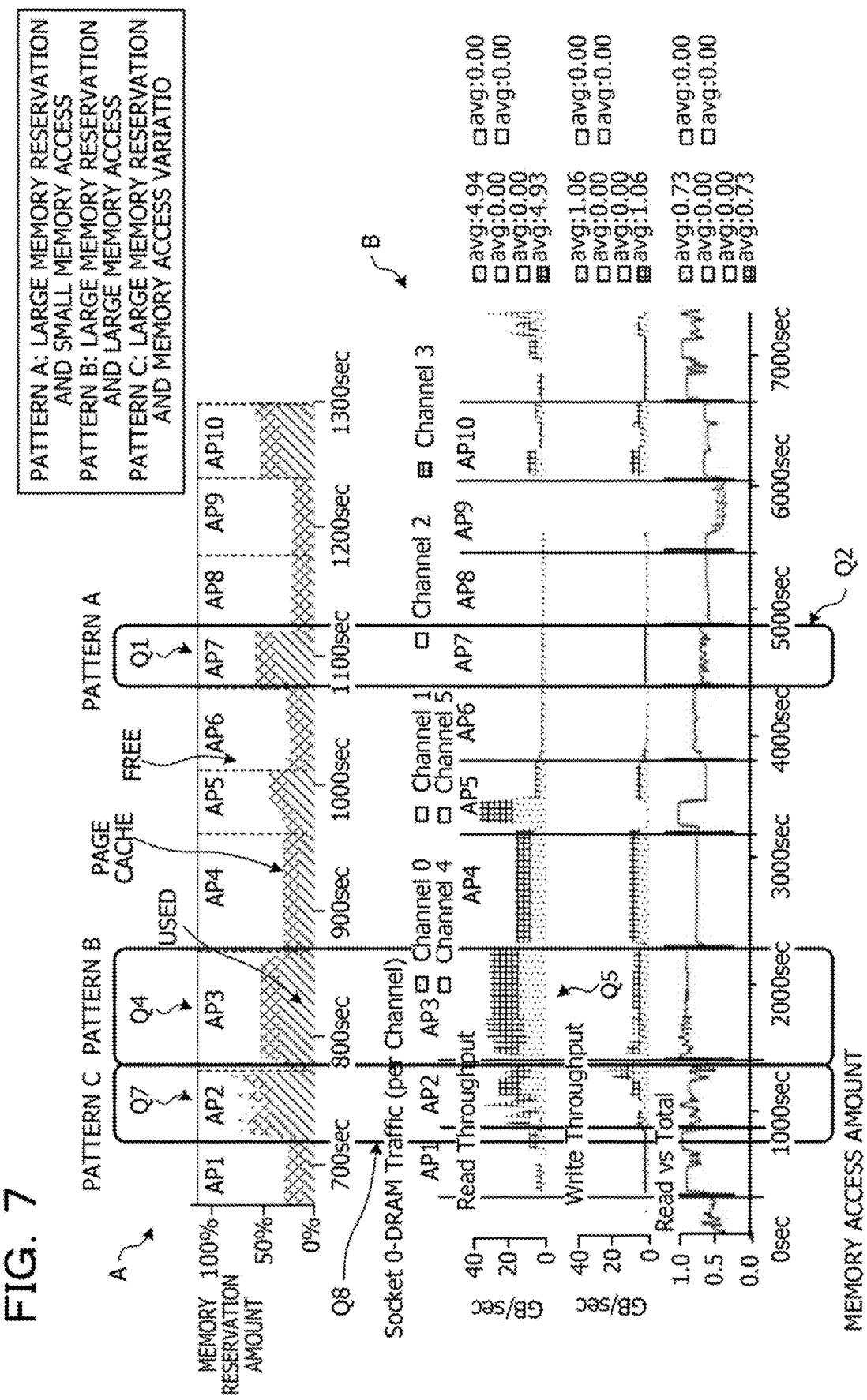
FIG. 7 is a diagram illustrating an example in which patterns A, B, and C are associated with the memory performance characteristic information illustrated in FIG. 3.
Figure 8:
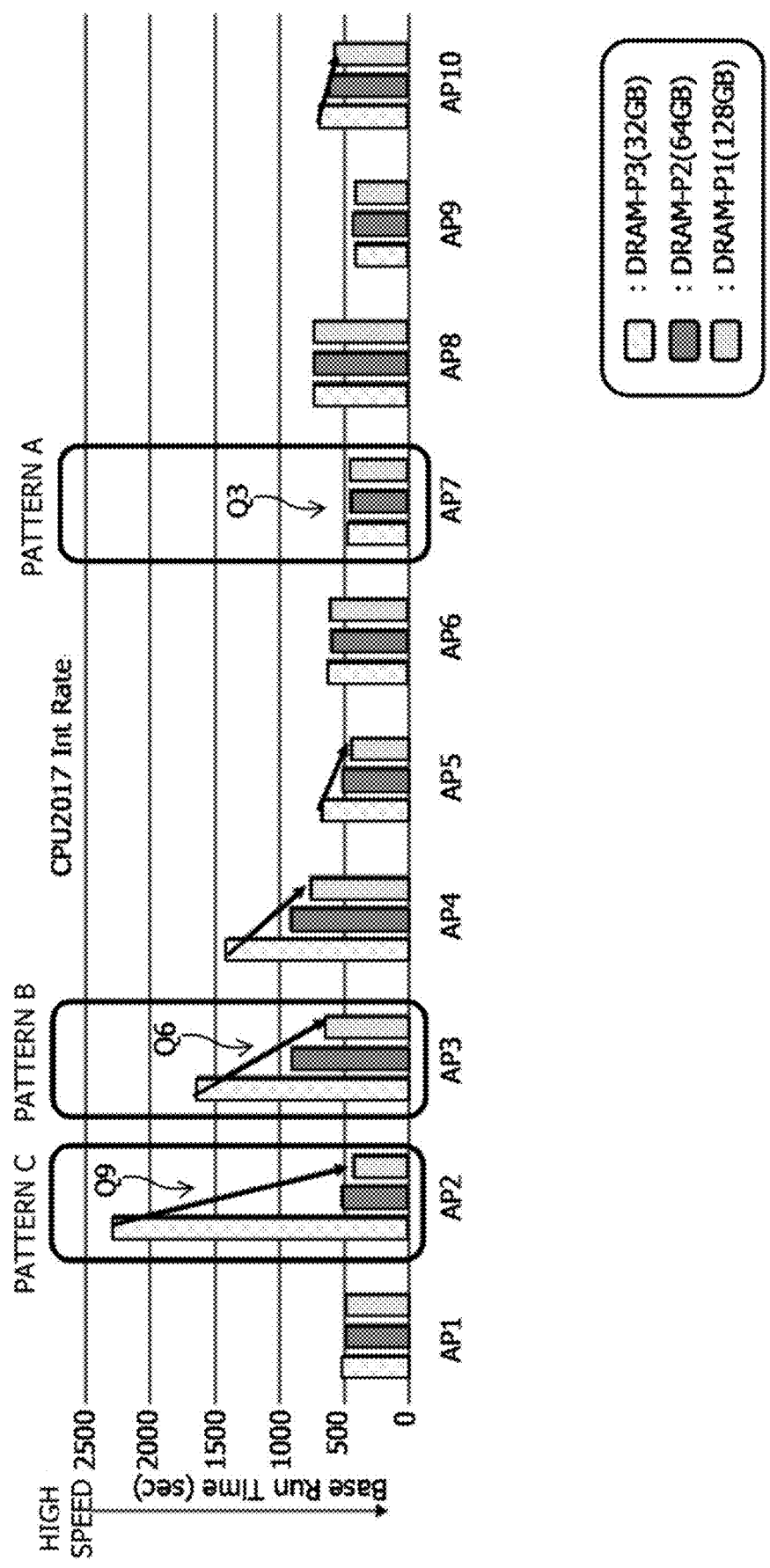
FIG. 8 is a diagram illustrating an example in which patterns A, B, and C are associated with the memory performance characteristic information illustrated in FIG. 5.

FIG. 7 is a diagram illustrating an example in which the patterns A, B, and C are associated with the memory performance characteristic information illustrated in FIG. 3, and FIG. 8 is a diagram illustrating an example in which the patterns A, B, and C are associated with the memory performance characteristic information illustrated in FIG. 5.

In the example illustrated in FIG. 7, in 531.deepsjeng_r (AP7), the memory reservation amount is large (see reference sign Q1) and the memory access amount is small (see reference sign Q2). Furthermore, as illustrated in FIG. 8, in 531.deepsjeng_r (AP7), the performance is not improved even if the memory band is changed to the configurations P3, P2, and P1. That is, there is no change in the performance even if the memory band is increased (see reference sign Q3). Therefore, 531.deepsjeng_r (AP7) is determined to correspond to the pattern A.

Furthermore, in the example illustrated in FIG. 7, in 505.mcf_r (AP3), the memory reservation amount is large (see reference sign Q4) and the memory access amount is also large (see reference sign Q5). Furthermore, as illustrated in FIG. 8, in 505.mcf_r(AP3), the performance is improved by changing the memory band to the configurations P3, P2, and P1 (see reference sign Q6). Therefore, 505.mcf_r (AP3) is determined to correspond to the pattern B.

Furthermore, in the example illustrated in FIG. 7, in 502.gcc_r (AP2), the memory reservation amount is large and varies (see reference sign Q7), and the memory access amount also varies (see reference sign Q8). Furthermore, as illustrated in FIG. 8, in 502.gcc_r (AP2), the performance is improved by changing the memory band to the configurations P3, P2, and P1 (see reference sign Q9). Therefore, 502.gcc_r (AP2) is determined to correspond to the pattern C.

Hereinafter, the analysis unit 105 measuring the memory band dependency by analyzing the change in the performance due to the change in the memory band, for the execution application programs classified into the patterns A to C, may be referred to as performance analysis.

The cost calculation unit 103 calculates the cost for implementing the recommended memory configuration determined by the configuration determination unit 106 to be described below. Specifically, the cost calculation unit 103 calculates respective costs of the DRAM and the DCPMM for implementing the recommended memory configuration and then calculates a total cost by totaling the costs.

The performance calculation unit 104 obtains the performance by the recommended memory configuration determined by the configuration determination unit 106 to be described below, and calculates a percentage (ratio) of the performance by the recommended memory configuration to the performance by the pre-change configuration.

For example, the performance calculation unit 104 causes the computer to be examined 20 to change the configuration to obtain the recommended memory configuration determined by the configuration determination unit 106. Then, the performance calculation unit 104 causes the computer to be examined 20 to execute the execution application program and execute the performance analysis hardware counter 202 to acquire the memory performance characteristic information of the computer to be examined 20.

Furthermore, the performance calculation unit 104 has a function to calculate, for the execution application program with the memory use tendency of the pattern C, the performance degradation occurrence probability at the time of executing the execution application program from the variation in the memory access amount variation. This performance degradation is due to occurrence of swapping to the storage device 13.

Figure 9:
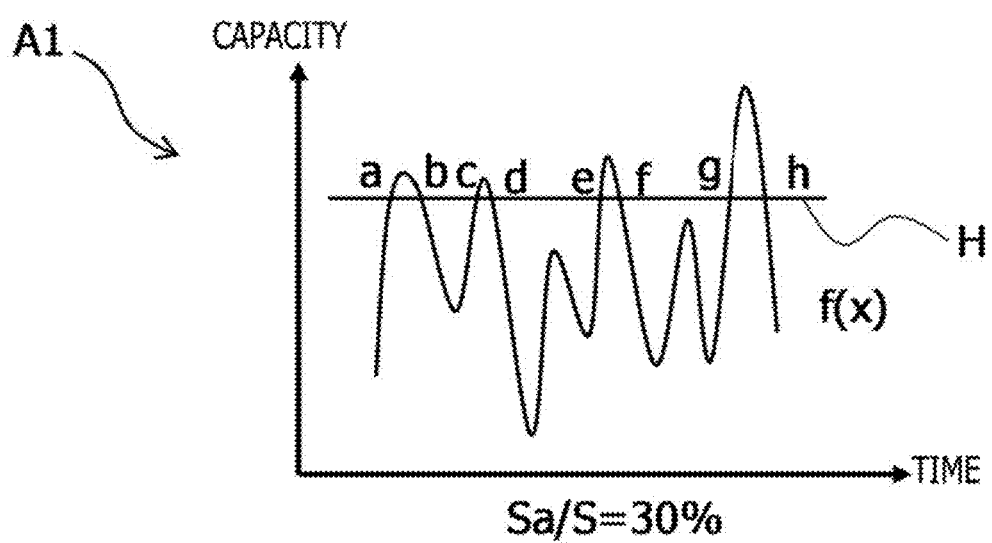
FIG. 9 is a graph for describing a method of calculating a performance degradation occurrence probability by a performance calculation unit in the computer system as an example of the embodiment.

FIG. 9 is a graph for describing a method of calculating the performance degradation occurrence probability by the performance calculation unit 104 in the computer system 1 as an example of the embodiment. In FIG. 9, reference sign A represents a curve graph illustrating the variation in the memory access amount. Hereinafter, in FIG. 9, the curve illustrating the variation in the memory access amount is expressed by an expression f(x).

Furthermore, in the graph illustrated in FIG. 9, a memory capacity H in which memory swapping occurs is illustrated as a horizontal line, and reference signs a to h are illustrated at intersection of the curve f(x) illustrating the variation in the memory access amount and the horizontal line illustrating the memory capacity H.

That is, the memory swapping occurs in a state where the curve illustrating the variation in the memory access amount is located above the horizontal line illustrating the memory capacity H. The state where the curve illustrating the variation in the memory access amount is located above the horizontal line illustrating the memory capacity H can be expressed by the following expression (1) using a definite integral.

$$Sa = \int_a^b f(x)dx + \int_c^d f(x)dx + \int_e^f f(x)dx + \int_g^h f(x)dx \quad (1)$$

Furthermore, the area of the curve f(x) can be expressed by the following expression (2).

$$S = \int f(x)dx \quad (2)$$

On the basis of these equations (1) and (2), the performance calculation unit 104 calculates a ratio (Sa/S) of the state in which the memory swapping has occurred to the variation in the memory access amount as the performance degradation occurrence probability at the time of execution of the execution application program.

The configuration determination unit 106 determines (creates) the recommended hardware configuration (recommended memory configuration) of the computer to be examined 20 according to the patterns A to D determined by the analysis unit 105.

For example, the configuration determination unit 106 creates (determines), for the computer to be examined 20, the recommended configuration according to the determined patterns A to D on the basis of the hardware configuration (memory configuration) of the computer to be examined 20 at the time of execution of each execution application program. Note that the hardware configuration (memory configuration) of the computer to be examined 20 at the time of execution of each execution application program may also be referred to as pre-change configuration.

FIG. 10 is a diagram illustrating the pre-change configuration in the computer system 1 as an example of an embodiment.

The pre-change configuration illustrated in FIG. 10 includes twelve 128-GB DRAMs, and the memory configuration costs X0 yen. For convenience, the cost of the pre-change configuration is 100%.

Furthermore, it is assumed that, as a result of execution of the execution application program in the pattern A for the pre-change configuration, the memory reservation amount is 921 GB and the memory access amount is 24 GB/sec. Moreover, it is assumed that the maximum memory band is 240 GB/sec.

(Pattern A)

As a suitable memory configuration (hardware configuration) for the execution application program determined to be the pattern A, the configuration determination unit 106 determines one or more types of recommended memory configurations (recommended hardware configurations) as illustrated in FIG. 11.

The configuration determination unit 106 determines a memory configuration in which the memory is secured using the DCPMM and the memory access is covered only by the DRAM as a cache memory, as the recommended memory configuration (hardware configuration) suitable for the execution application program in the pattern A.

FIG. 11 is a diagram illustrating the recommended memory configurations in the computer system 1 as an example of an embodiment. In the example illustrated in FIG. 11, three types of recommended memory configurations R1 to R3 corresponding to the pattern A are illustrated as a list for the pre-change configuration illustrated in FIG. 10. Each of the recommended memory configurations R1 to R3 has comparable performance with the pre-change configuration.

For example, the recommended memory configuration R3 includes two 8-GB DRAMs as minimum DRAMs for satisfying the memory access amount of 24 GB/sec, and two 512-GB DCPMMs for satisfying the memory reservation amount of 951.6 GB. This is because, in principle, preparation of the same number of DRAMs and DCPMMs is needed.

The recommended memory configuration R2 includes four 8-GB DRAMs and four 256-GB DCPMMs. Furthermore, the recommended memory configuration R1 includes eight 8-GB DRAMs and eight 128-GB DCPMMs.

Furthermore, FIG. 11 illustrates respective costs of the DRAM and the DCPMM calculated by the cost calculation unit 103 and the total cost thereof in the recommended memory configurations R1 to R3.

Moreover, FIG. 11 illustrates the percentage of the total cost to the cost of the pre-change configuration, which is calculated by the cost calculation unit 103, in the recommended memory configurations R1 to R3.

For example, the percentage of the total cost of the recommended memory configuration R1 to the cost of the pre-change configuration is 10%. This shows that the recommended memory configuration R1 enables 90% cost reduction without degrading the performance as compared with the pre-change configuration.

(Pattern B)

For the execution application program determined to be the pattern B, the configuration determination unit 106 determines a memory configuration without using the DCPMM and using only the DRAM as the recommended memory configuration. This is because provision of the DCPMM results in performance degradation and an increase in cost.

FIGS. 12 to 15 are diagrams each illustrating the memory performance characteristic information of the computer to be examined 20 in the computer system 1 as an example of an embodiment.

In the examples illustrated in FIGS. 12 to 15, processing performance obtained when the memory size is changed is compared among each of the cases configured using only the DRAM (DRAM-P1 to P3) and the cases configured using the DRAM and the DCPMM (DCPMM-P1 to P3).

Figure 12:
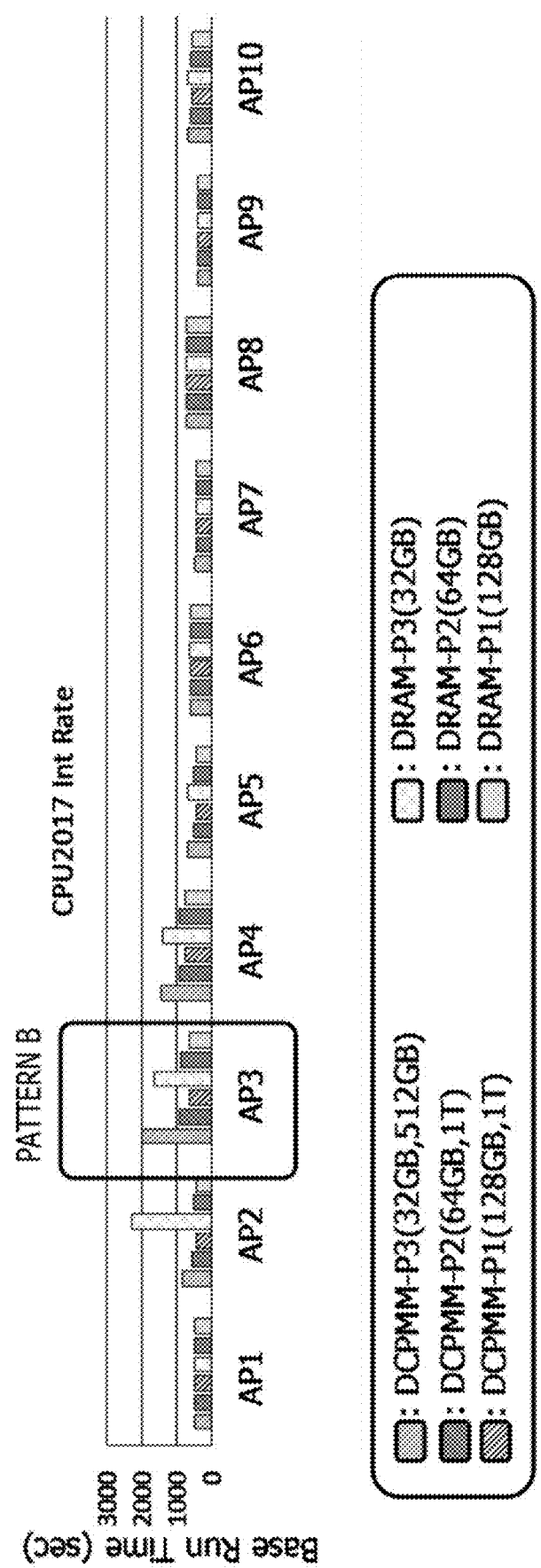
FIG. 12 is a diagram illustrating memory performance characteristic information in the computer to be examined of the computer system as an example of an embodiment.
Figure 13:
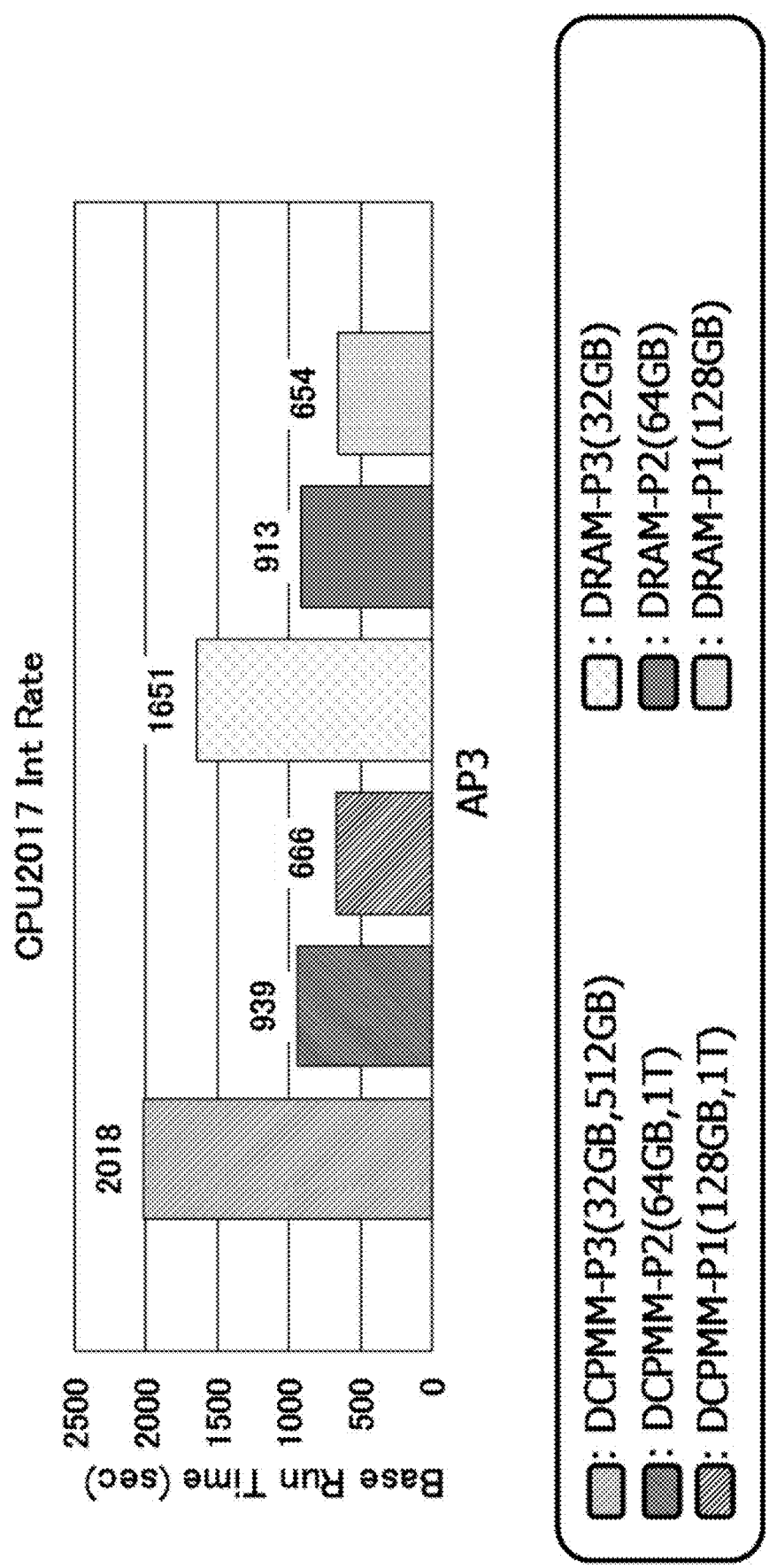
FIG. 13 is a diagram illustrating memory performance characteristic information in the computer to be examined of the computer system as an example of an embodiment.

Here, FIG. 12 illustrates changes in the processing performance in the case of changing the memory configuration for each of ten types of execution application programs by bar graphs. FIG. 13 illustrates the extracted execution application program [505.mcf_r (AP3)] in the pattern B among the ten types of execution application programs illustrated in FIG. 12.

FIG. 14 is a table illustrating the processing performance of the respective cases (DRAM-P1 to P3) configured using only the DRAM among the bar graphs in the pattern B in FIG. 13. FIG. 15 is a table illustrating the processing performance of the cases (DCPMM-P1 to P3) configured using the DRAM and the DCPMM among the bar graphs in the pattern B in FIG. 13.

In the examples illustrated in FIGS. 12 to 15, the size of the DRAM is changed to three types of 32 GB (16 GB×2), 64 GB (16 GB×4), and 128 GB (16 GB×8). Furthermore, the size of the DCPMM is changed and combined into two types of 512 GB (256 GB×2) and 1 TB (254 GB×4) according to the number of DRAMs in accordance with rules of the memory mode of the DCPMM.

Furthermore, the tables in FIGS. 14 and 15 illustrate the percentage of the total cost with respect to the cost (100%) in the case of including only the DRAM of 128 GB (16 GB×8) in each memory configuration. The percentage of the total cost is calculated by the cost calculation unit 103.

Moreover, the tables in FIGS. 14 and 15 illustrate the performance ratio as the percentage with respect to the processing performance (100%) in the case of including only the DRAM of 128 GB (16 GB×8) in each memory configuration. These performance ratios (percentages) are calculated by the performance calculation unit 104.

Taking these FIGS. 12 to 15 into consideration, in the case of the pattern B, the performance data is lowered while the cost rises in the case of mounting the DCPMM, as compared with the case of not including the DCPMM. Therefore, it turns out that it is better not to mount the DCPMM.

(Pattern C)

As a suitable memory configuration (hardware configuration) for the execution application program determined to be the pattern C, the configuration determination unit 106 determines one or more types of recommended memory configurations (recommended hardware configurations).

For example, for the execution application program determined to be the pattern C, the configuration determination unit 106 determines a memory configuration using the DCPMM and the DRAM and a memory configuration using only the DRAM as the recommended memory configurations.

FIGS. 16 to 19 are diagrams each illustrating memory performance characteristic information in the computer to be examined 20 of the computer system 1 as an example of an embodiment.

In the examples illustrated in FIGS. 16 to 19, processing performance obtained when the memory size is changed is compared among each of the cases configured using only the DRAM (DRAM-P1 to P3) and the cases configured using the DRAM and the DCPMM (DCPMM-P1 to P3). Note that, hereinafter, the recommended memory configuration configured using only the DRAM may be referred to as first recommended memory configuration. Furthermore, hereinafter, the recommended memory configuration including the DRAM and the DCPMM may be referred to as second recommended memory configuration.

Figure 16:
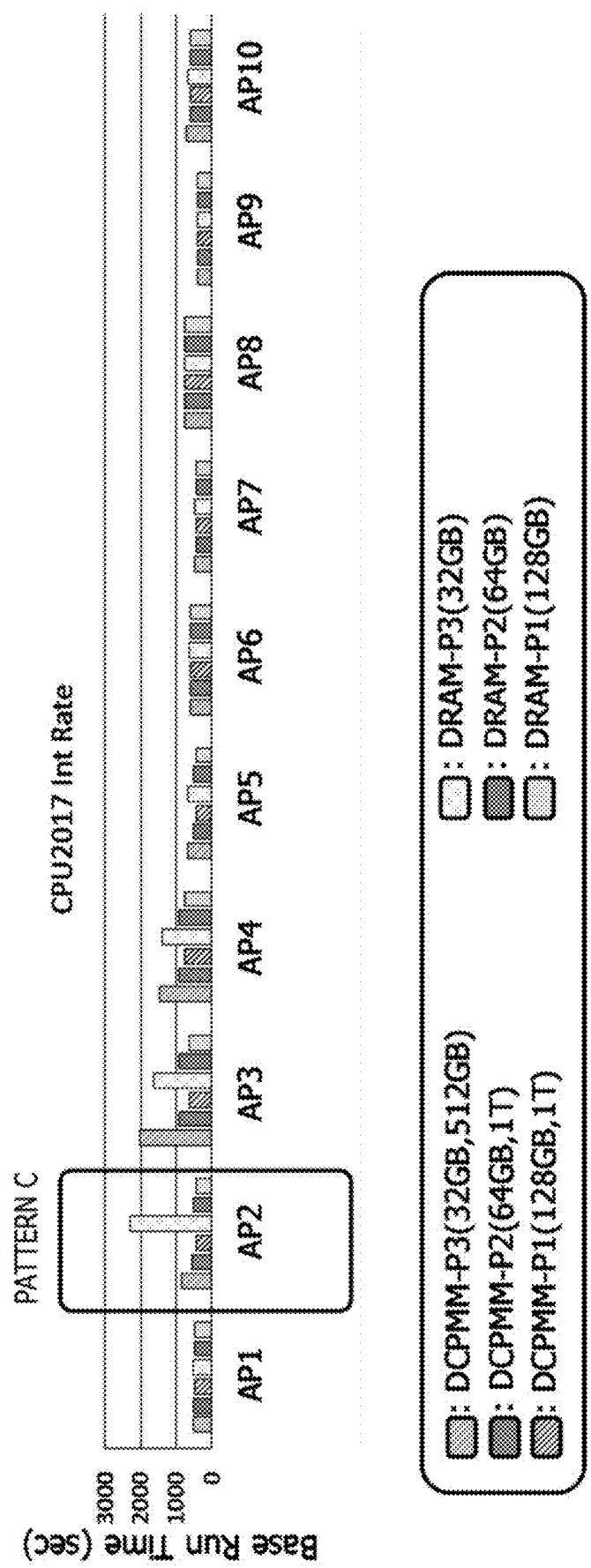
FIG. 16 is a diagram illustrating memory performance characteristic information in the computer to be examined of the computer system as an example of an embodiment.
Figure 17:
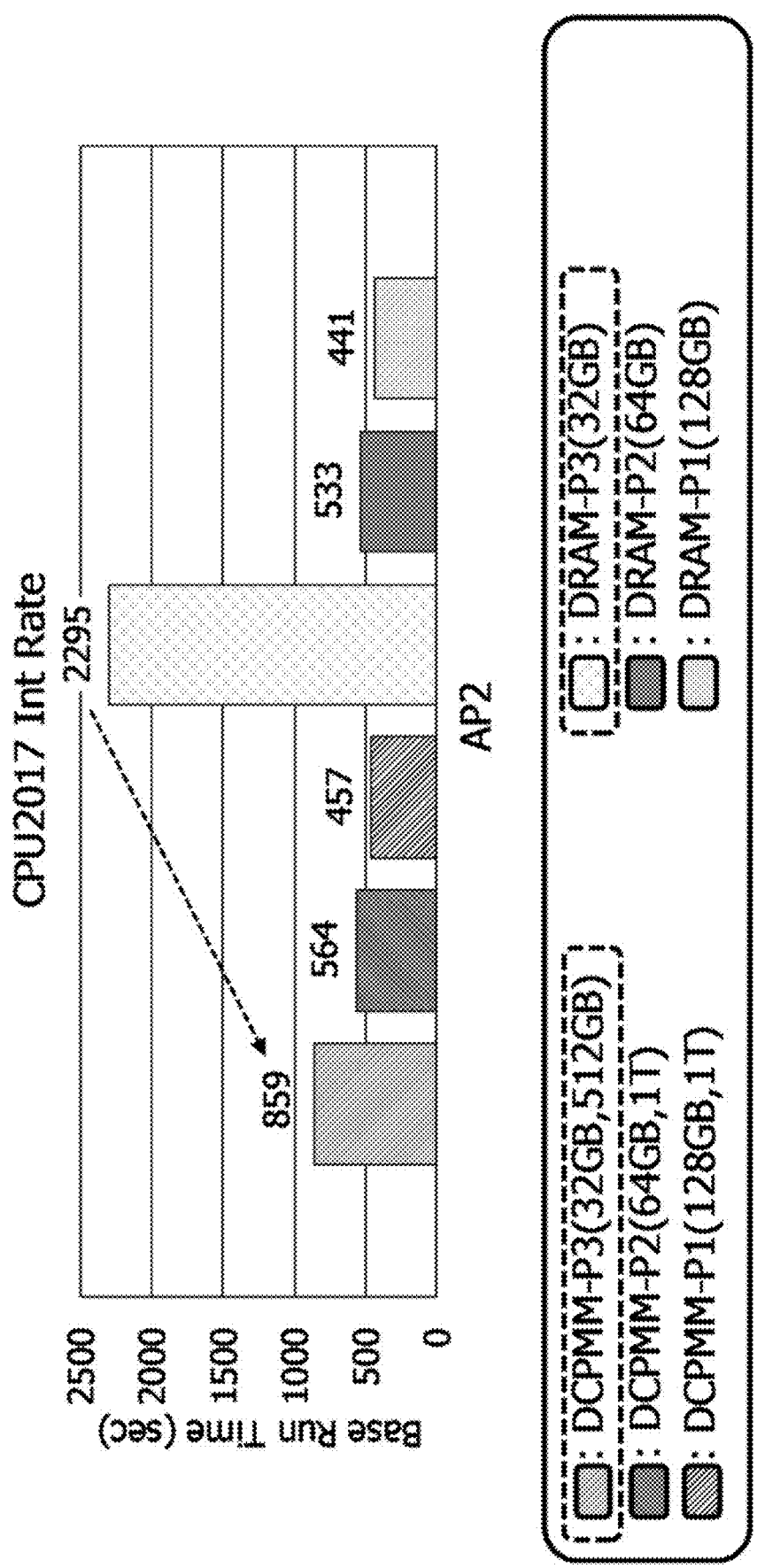
FIG. 17 is a diagram illustrating memory performance characteristic information in the computer to be examined of the computer system as an example of an embodiment.

Here, FIG. 16 illustrates changes in the processing performance in the case of changing the memory configuration for each of ten types of execution application programs by bar graphs. FIG. 17 illustrates the extracted execution application program [502.gcc_r (AP2)] in the pattern C among the ten types of execution application programs illustrated in FIG. 16.

FIG. 18 is a table illustrating the processing performance of the respective cases (DRAM-P1 to P3) configured using only the DRAM among the bar graphs in the pattern C in FIG. 17. FIG. 19 is a table illustrating the processing performance of the cases (DCPMM-P1 to P3) configured using the DRAM and the DCPMM among the bar graphs in the pattern C in FIG. 17.

In the example illustrated in FIGS. 16 and 17, the size of the DRAM is changed to three types of 512 GB (128 GB×4), 768 GB (128 GB×6), and 1536 GB (128 GB×12). Furthermore, the size of the DCPMM is changed and combined into two types of 512 GB (256 GB×2) and 1 TB (254 GB×4) according to the number of DRAMs in accordance with rules of the memory mode of the DCPMM.

Furthermore, in the tables illustrated in FIGS. 18 and 19, the size of the DRAM is changed to three types of 32 GB (16 GB×2), 64 GB (16 GB×4), and 128 GB (16 GB×8). Furthermore, the size of the DCPMM is 1 TB (254 GB×4).

Furthermore, the tables in FIGS. 18 and 19 illustrate the percentage of the total cost with respect to the cost (100%) in the case of including only the DRAM of 1536 GB (128 GB×12) in each memory configuration. The percentage of the total cost is calculated by the cost calculation unit 103.

Moreover, the tables in FIGS. 18 and 19 illustrate the performance ratio as the percentage with respect to the processing performance (100%) in the case of including only the DRAM of 1536 GB (128 GB×12) in each memory configuration. These performance ratios (percentages) are calculated by the performance calculation unit 104.

(Pattern D)

As the memory configuration (hardware configuration) suitable for the execution application program determined to be the pattern D, the configuration determination unit 106 determines a memory configuration including only the DRAM in accordance with the maximum memory reservation amount by the execution application program as the recommended memory configuration.

That is, the configuration determination unit 106 determines, for the execution application program in the pattern D, a memory configuration obtained by reducing the DRAM having the pre-change configuration in accordance with the maximum memory reservation amount as the recommended memory configuration.

FIG. 20 is a diagram illustrating the recommended memory configuration in the computer system 1 as an example of an embodiment. In the example illustrated in FIG. 20, the recommended memory configuration corresponding to the pattern D is illustrated for the pre-change configuration illustrated in FIG. 10. This recommended memory configuration has comparable performance with the pre-change configuration.

Furthermore, in the memory configuration illustrated in FIG. 20, the percentage of the total cost (×4) with respect to the cost (100%) of the pre-change configuration, and it is represented that the cost regarding the memory configuration can be reduced by 37(=100-67)% with respect to the pre-change configuration. The percentage of the total cost is calculated by the cost calculation unit 103.

The presentation unit 107 presents the recommended memory configuration determined by the configuration determination unit 106 to the user of the present computer system 1, or the like.

The presentation unit 107 may create a presentation screen 140 including the information regarding the recommended memory configuration and display (output) the presentation screen 140 on the monitor 14a (output destination, see FIG. 29) provided in the analysis server 10, or the like. The presentation unit 107 corresponds to an output unit that outputs recommended memory configuration information indicating a recommended memory configuration to an output destination. Furthermore, the presentation unit 107 may display the presentation screen 140 on a monitor (output destination) (not illustrated) provided in the computer to be examined 20 or an output device (output destination) such as a printer.

FIGS. 21 to 24 are diagrams each illustrating the presentation screen 140 in the computer system 1 as an example of the embodiment.

Figure 21:
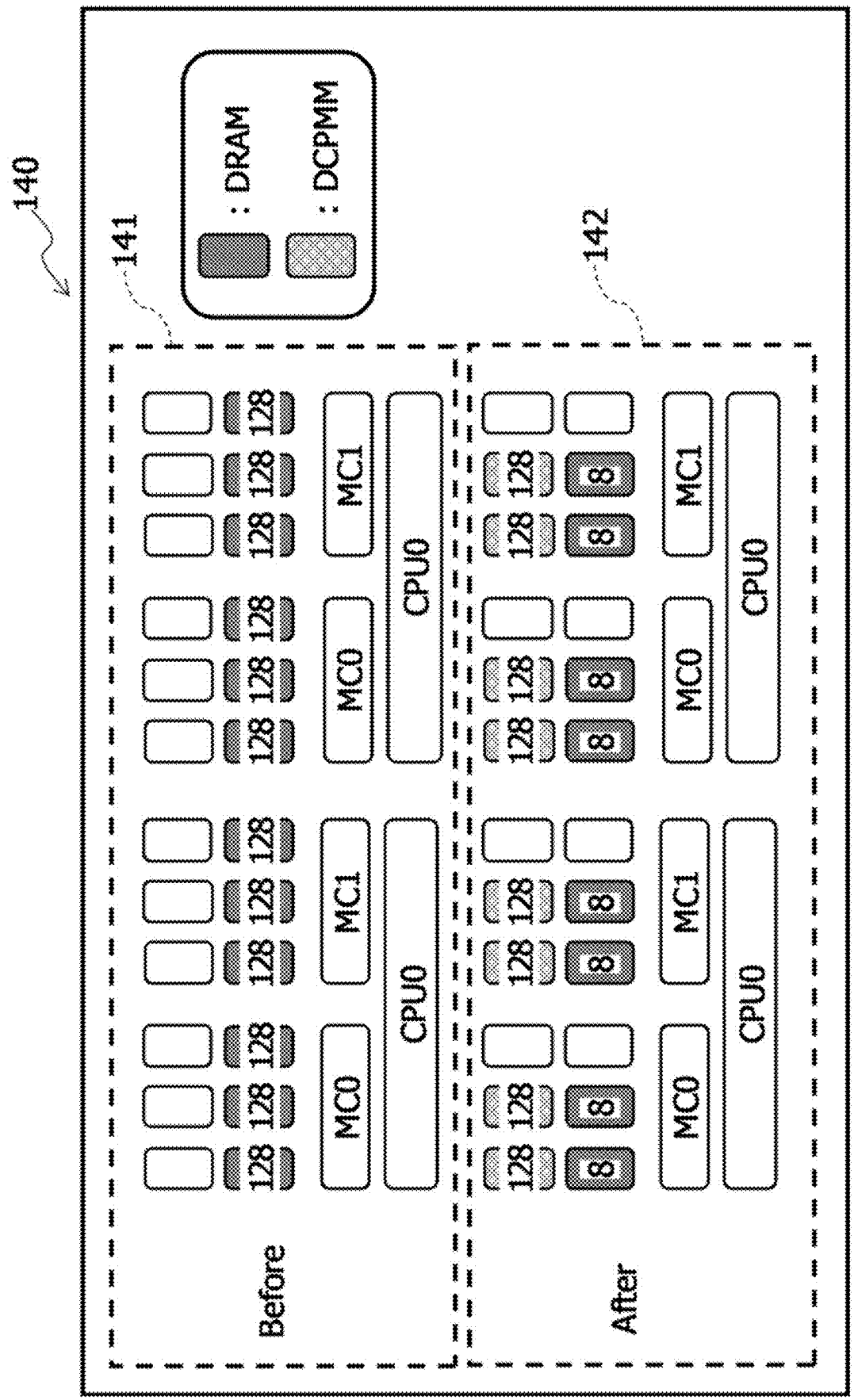
FIG. 21 is a diagram illustrating a presentation screen in the computer system as an example of the embodiment.
Figure 22:
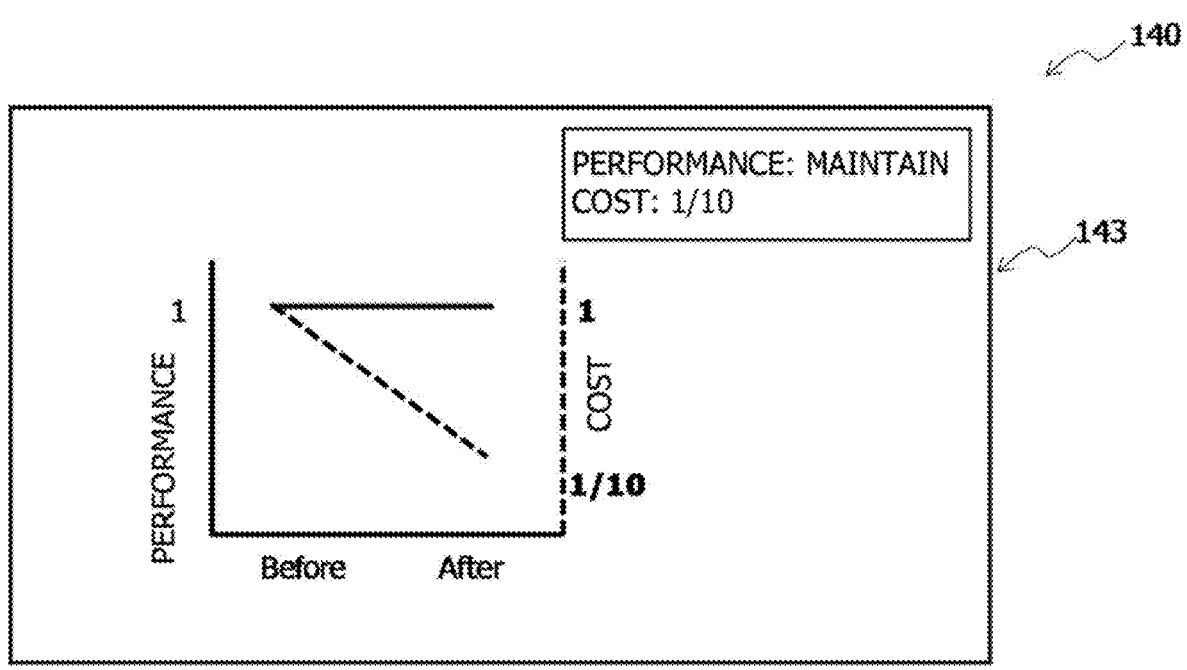
FIG. 22 is a diagram illustrating a presentation screen in the computer system as an example of the embodiment.
Figure 23:
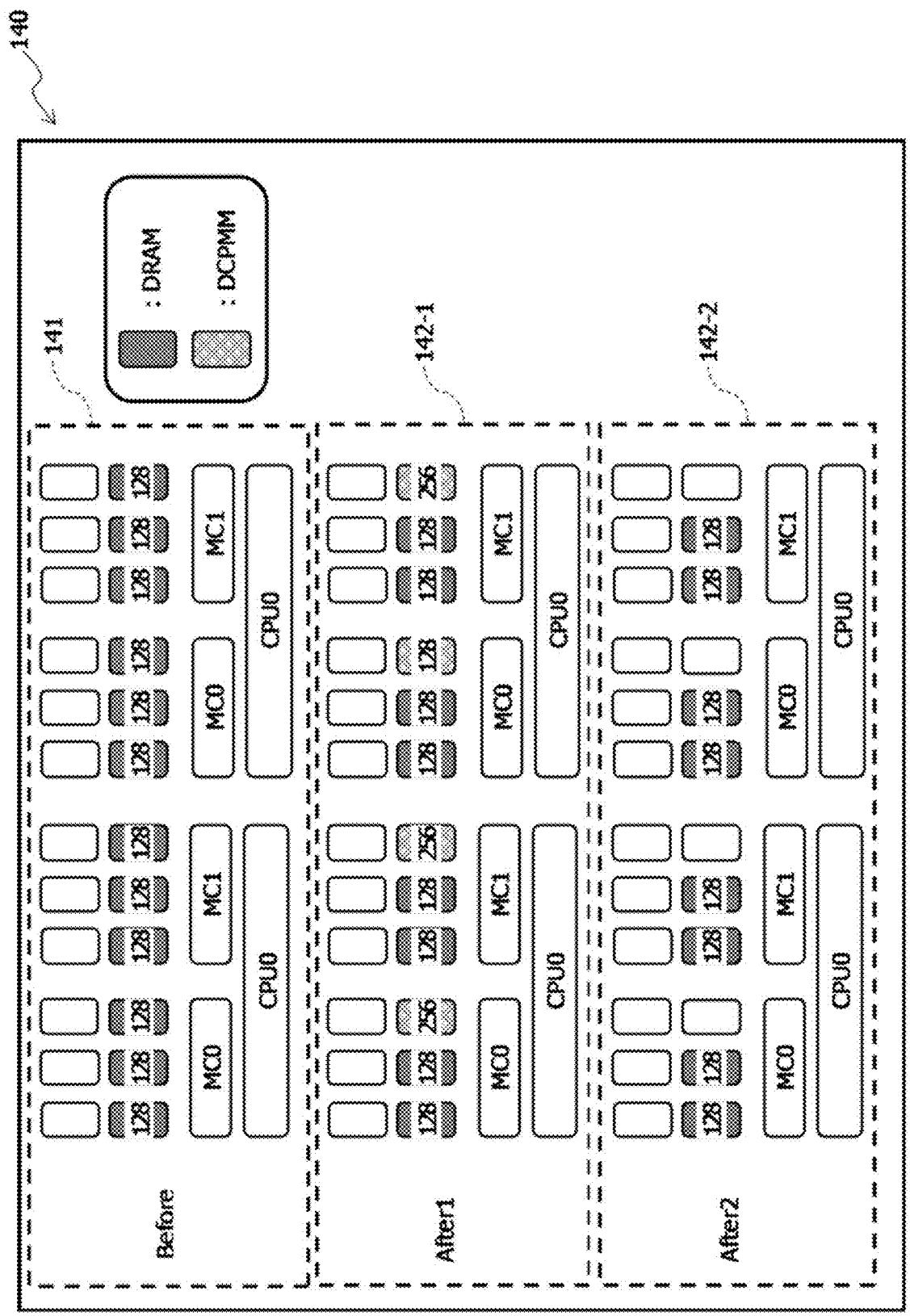
FIG. 23 is a diagram illustrating a presentation screen in the computer system as an example of the embodiment.

The presentation screens 140 illustrated in FIGS. 21 and 22 display the recommended memory configuration regarding the pattern A, which has been determined by the configuration determination unit 106. The presentation screens 140 illustrated in FIGS. 23 and 24 display the recommended memory configurations regarding the pattern C, which have been determined by the configuration determination unit 106.

On the presentation screen 140 illustrated in FIG. 21, a pre-change configuration diagram 141 illustrating the pre-change configuration and a recommended memory configuration diagram 142 illustrating the recommended memory configuration are displayed one above the other. Furthermore, on the presentation screen 140 illustrated in FIG. 23, the pre-change configuration diagram 141 illustrating the pre-change configuration and recommended memory configuration diagrams 142-1 and 142-2 illustrating the recommended memory configurations are displayed one above another. Here, the recommended memory configuration diagram 142-1 illustrates the recommended memory configuration including the DRAM and the DCPMM, and the recommended memory configuration diagram 142-2 illustrates the recommended memory configuration configured using only the DRAM.

By referring to the pre-change configuration diagram 141 and the recommended memory configuration diagrams 142, 142-1, and 142-2 on the presentation screen 140, the user or the like can easily grasp the difference between the pre-change configuration and the recommended memory configuration. Note that, hereinafter, in a case where the recommended memory configuration diagrams 142, 142-1, and 142-2 are not particularly distinguished, they are written as recommended memory configuration diagram(s) 142.

Furthermore, the presentation screen 140 illustrated in FIG. 22 displays a performance/cost graph (second presentation diagram) 143 illustrating the performance and the cost of the computer to be examined 20 in the recommended memory configuration, and the performance and the cost of the computer to be examined 20 in the pre-change configuration.

The presentation unit 107 creates the performance/cost graph 143 by plotting a performance value of the pre-change configuration and a performance value of the recommended memory configuration calculated by the performance calculation unit 104 on the same graph. Similarly, the presentation unit 107 creates the performance/cost graph 143 by plotting the cost for configuring the pre-change configuration and the cost for configuring the recommended memory configuration calculated by the cost calculation unit 103 on the same graph.

The performance/cost graph 143 in FIG. 22 illustrates the performance (Before) in the pre-change configuration and the performance (After) in the first recommended memory configuration calculated by the performance calculation unit 104 as a solid line graph. As illustrated in FIG. 22, it can be understood that the recommended memory configuration maintains the performance as compared with the pre-change configuration.

Furthermore, the performance/cost graph 143 in FIG. 22 illustrates the cost (Before) in the pre-change configuration and the cost (After) in the first recommended memory configuration calculated by the cost calculation unit 103 as a broken line graph. By referring to the performance/cost graph 143 illustrated in FIG. 22, it can be understood that the recommended memory configuration can be implemented at 1/10 the cost of the pre-change configuration.

Figure 24:
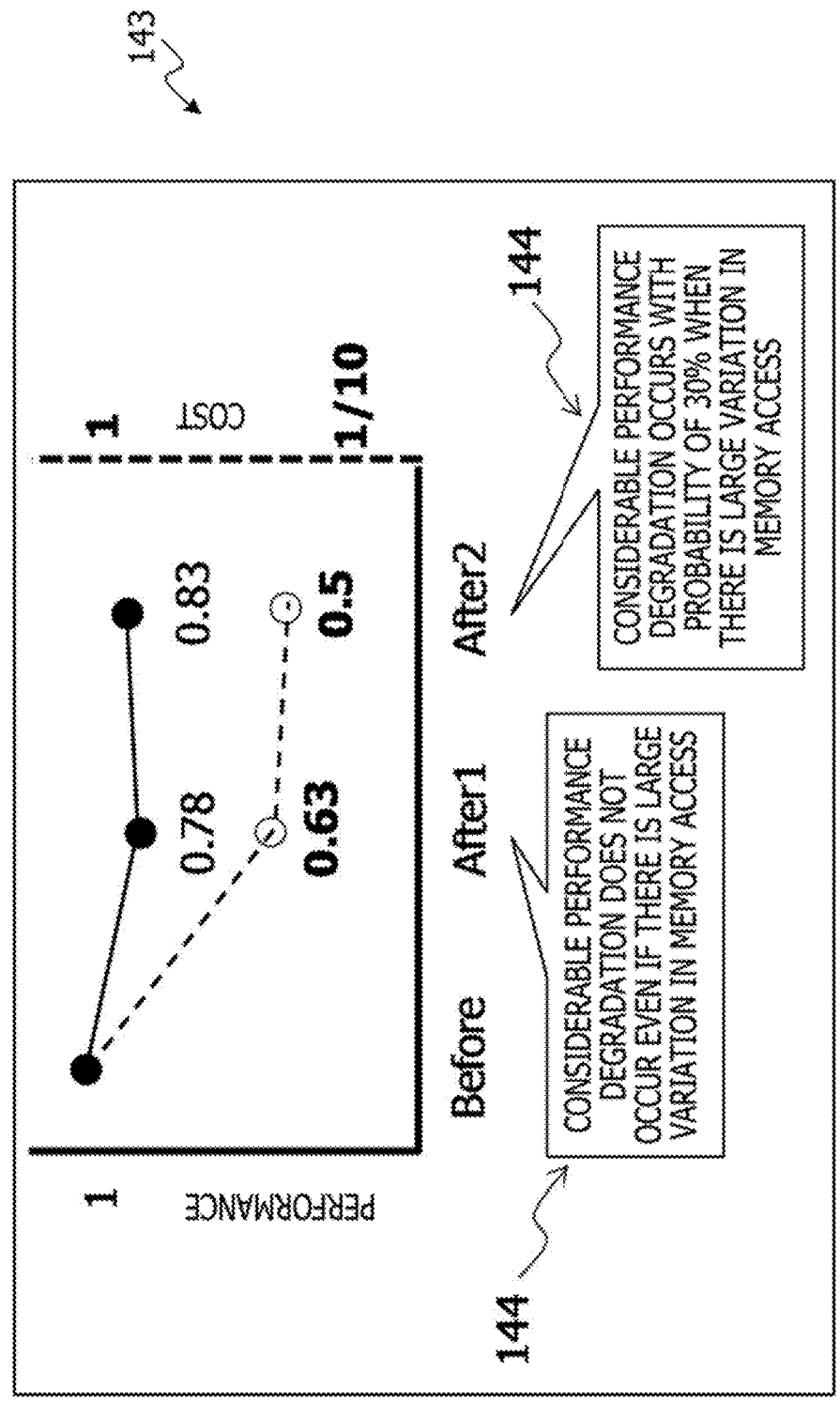
FIG. 24 is a diagram illustrating a presentation screen in the computer system as an example of the embodiment.

The performance/cost graph 143 in FIG. 24 illustrates the performance (Before) in the pre-change configuration and the performance (After2) in the first recommended memory configuration and the performance (After1) in the second recommended memory configuration calculated by the performance calculation unit 104 as a solid line graph.

Moreover, the performance/cost graph 143 illustrated in FIG. 24 may include a comment 144 for describing the first recommended memory configuration (After2) and a comment 144 for describing the second recommended memory configuration (After1). In the example illustrated in FIG. 24, a statement that "considerable performance degradation occurs with a probability of 30% in a case where there is large variation in the memory access" is displayed as the comment 144 for describing the first recommended memory configuration (After2). Furthermore, a statement that "considerable performance degradation does not occur even in a case where there is large variation in the memory access" is displayed as the comment 144 for describing the second recommended memory configuration (After1).

The user determines the memory configuration of the computer to be examined 20 by reference to the performance/cost graph 143 and the comments 144 of the performance/cost graph 143.

Furthermore, as described above, in the case of the pattern B, the performance data is lowered while the cost rises in the case of mounting the DCPMM, as compared with the case of not including the DCPMM. Therefore, the presentation unit 107 displays a message stating that it is better not to mount the DCPMM and the reason therefor (the performance data is lowered while the cost rises in the case of mounting DCPMM, as compared with the case of not including DCPMM) on the presentation screen 140.

For example, the presentation unit 107 may display a message stating that "currently, the memory capacity and the bandwidth are both needed so it is better not to expand the memory with DCPMM" on the presentation screen 140.

(B) Operation

Figure 25:
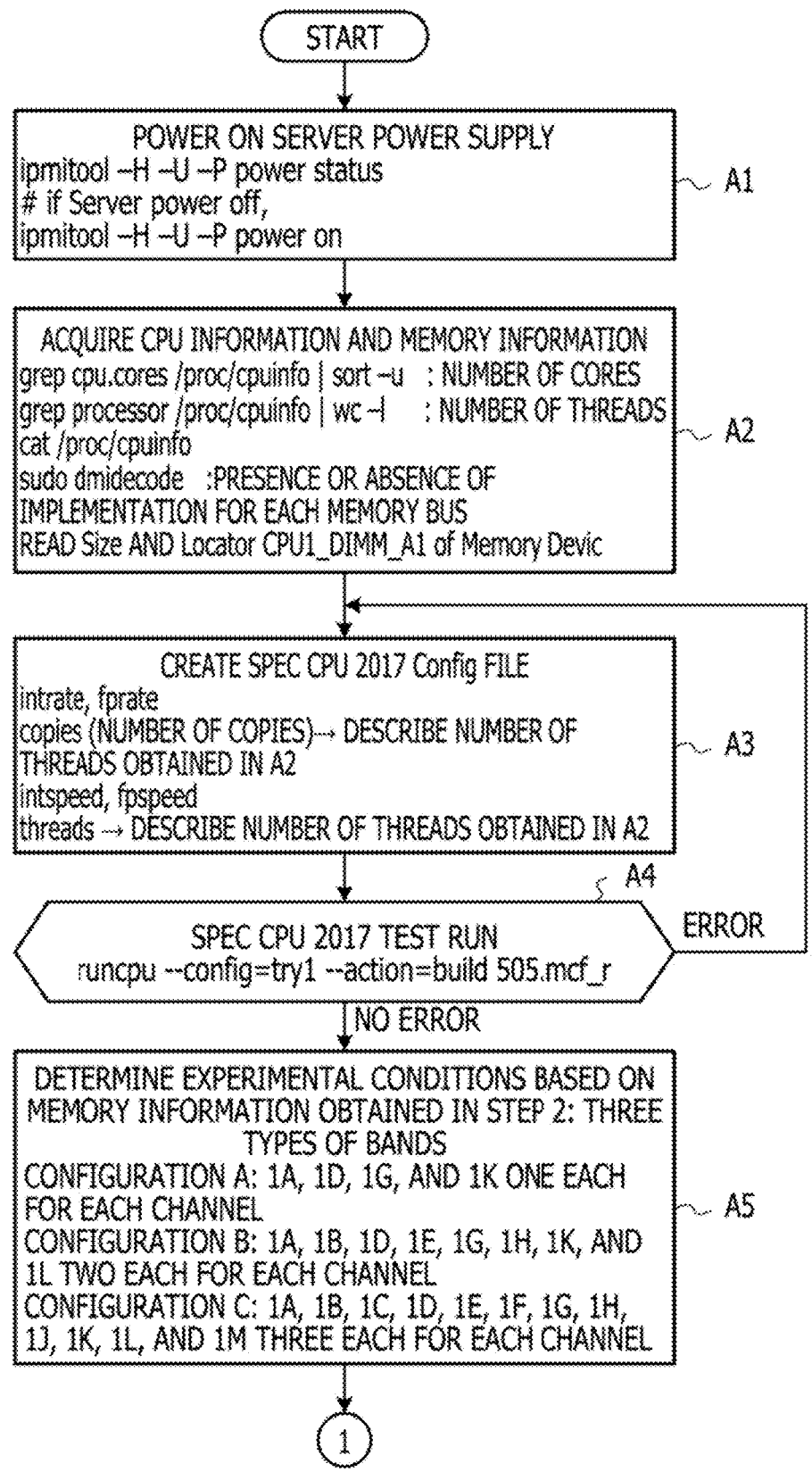
FIG. 25 is a flowchart for describing processing of the computer system as an example of the embodiment.
Figure 26:
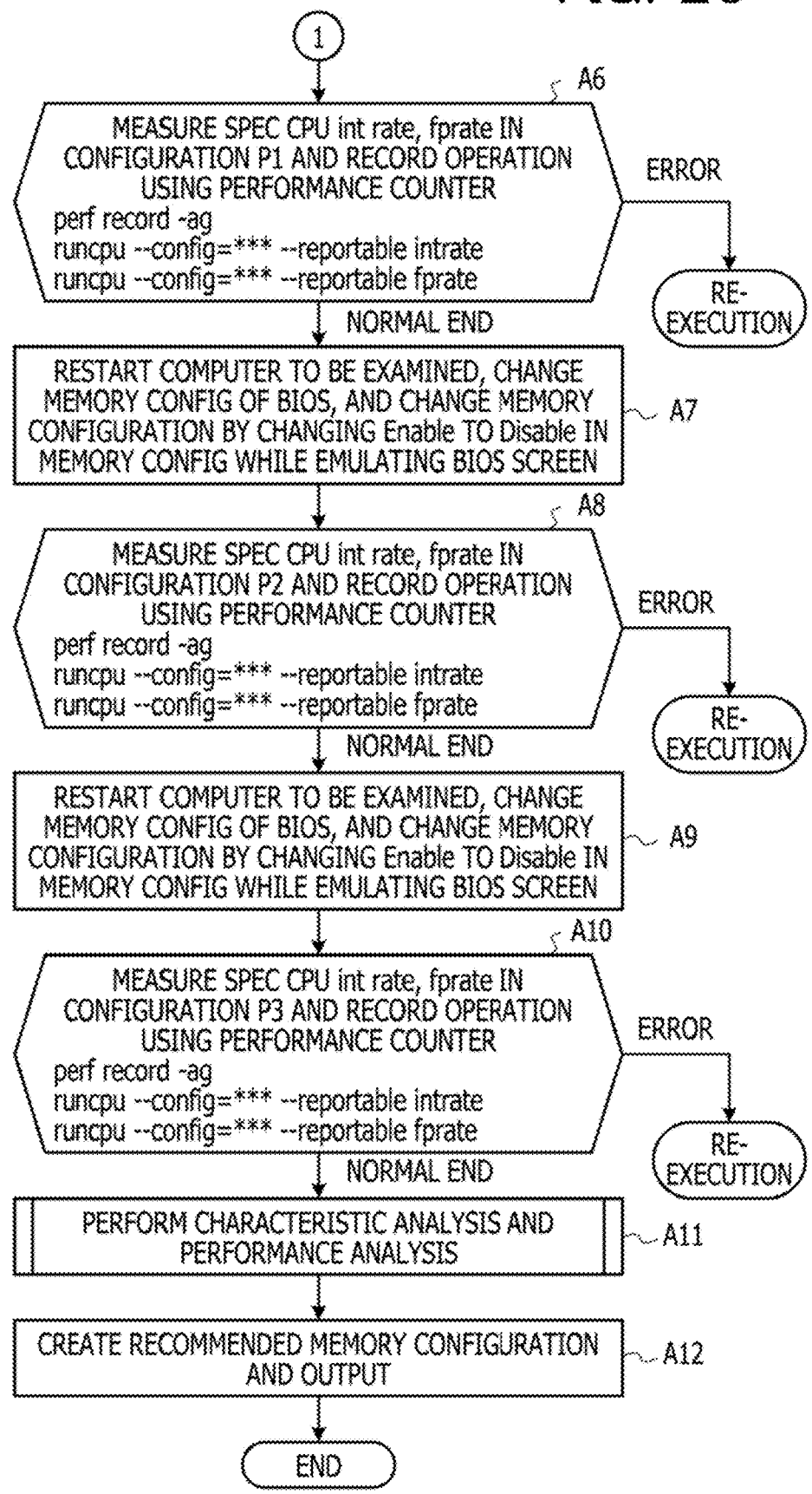
FIG. 26 is a flowchart for describing processing of the computer system as an example of the embodiment.

Processing of the computer system 1 as an example of an embodiment configured as described above will be described with reference to the flowcharts (steps A1 to A12) illustrated in FIGS. 25 and 26. Note that FIG. 25 illustrates the processing in steps A1 to A5 and FIG. 26 illustrates the processing in steps A6 to A12.

In step A1, the analysis server 10 accesses the BMC 208 via the IPMI to power on the computer to be examined 20.

For example, in the analysis server 10, the collection unit 101 causes the computer to be examined 20 to execute the following command, for example.

ipmitool -H -U -P power status # if Server power off, ipmitool -H -U -P power on In step A2, the collection unit 101 of the analysis server 10 activates the OS 203 (Linux) in the computer to be examined 20 and acquires the CPU information 204 and the memory information 205. For example, the collection unit 101 is connected to the OS 203 by SSH and executes an information collection command to collect the information. The collection unit 101 causes the computer to be examined 20 to execute the following command, for example.

grep cpu.cores/proc/cpuinfo|sort -u: number of cores grep processor/proc/cpuinfo|wc -l: number of threads cat/proc/cpuinfosudo dmidecode: presence or absence of implementation for each memory bus (read Size and Locator CPU1_DIMM_A1 of Memory Device)

In step A3, the collection unit 101 creates setting information (SPEC CPU 2017 Config file) for executing the benchmark application 201 (SPEC CPU 2017 in the present embodiment) in the computer to be examined 20.

The collection unit 101 describes the number of threads obtained in step A2 in variable copies (the number of copies) for "intrate" and "fprate", for example.

Furthermore, the collection unit 101 describes the number of threads obtained in step A2 in variable threads for "intspeed" and "fpspeed".

Thereafter, the collection unit 101 causes the computer to be examined 20 to perform a test run of SPEC CPU 2017. The collection unit 101 causes the computer to be examined 20 to execute the following command, for example.

runcpu --config=try1 --action=build 505.mcf_r

In step A4, the collection unit 101 confirms the presence or absence of an error due to the execution of the test run. In the case where there is an error (see "error" route in step A4) as a result of the confirmation, the collection unit 101 returns the error analysis to step A3 and resets the SPEC CPU 2017 Config file.

In the case where there is no error (see "no error" route in step A4) as a result of the confirmation in step A4, the collection unit 101 moves to step A5.

In step A5, the collection unit 101 determines an experimental condition on the basis of the memory information 205 obtained in step A2. Specifically, the collection unit 101 sets configurations P1 to P3 for implementing three types of memory bands. In the following configurations P1 to P3, the DRAM slot 302 and DCPMM slot 303 to be used are defined.

Configuration P1: 1A, 1D, 1G, and 1K one each for each channel

Configuration P2: 1A, 1B, 1D, 1E, 1G, 1H, 1K, and 1L two each for each channel

Configuration P3: 1A, 1B, 1C, 1D, 1E, 1F, 1G, 1H, 1J, 1K, 1L, and 1M three each for each channel In steps A6 to A8 below, the collection unit 101 causes the computer to be examined 20 to execute the execution application program and measure the memory reservation amount and the memory access amount by the performance analysis hardware counter 202 in each of the configurations P1 to P3. Note that it is assumed that the memory configuration of the computer to be examined 20 is in the state of the configuration P1 at the start of the processing of the present flowchart.

In step A6, the collection unit 101 first causes the computer to be examined 20 to execute the execution application program and measure the memory reservation amount and the memory access amount by the performance analysis hardware counter 202 in the configuration P1.

For example, the collection unit 101 causes the computer to be examined 20 to measure SPEC CPU int rate, fprate and to record an operation using the performance counter (performance analysis hardware counter 202). The collection unit 101 causes the computer to be examined 20 to execute the following command, for example.

perf record -agruncpu --config=* --reportable intrateruncpu --config=* --reportable fprate The collection unit 101 confirms the presence or absence of an error due to execution of the execution application program and execution of measurement of the memory reservation amount and the memory access amount by the performance analysis hardware counter 202. In the case where there is an error (see "error" route in step A6) as a result of the confirmation, the collection unit 101 again causes the computer to be examined 20 to execute the execution application program and measure the memory reservation amount and the memory access amount by the performance analysis hardware counter 202.

As a result of the confirmation in step A6, the processing proceeds to step A7 in the case where there is no error (refer to "normal end" route in step A6).

Next, in step A7, the collection unit 101 restarts the computer to be examined 20 and changes the memory configuration. Thereby, the collection unit 101 sets the memory configuration of the computer to be examined 20 into the state of the configuration P2.

For example, the analysis server 10 (collection unit 101) changes the memory configuration of the computer to be examined 20 by emulating the BIOS screen of the computer to be examined 20 and changing Enable to Disable or Disable to Enable in the memory configuration menu. Thereby, the memory configuration of the computer to be examined 20 is set to the state of the configuration P2.

Furthermore, the collection unit 101 accesses the BMC 208 via the IPMI and restarts the computer to be examined 20 via the BMC 208.

In step A8, the collection unit 101 causes the computer to be examined 20 to execute the execution application program and measure the memory reservation amount and the memory access amount by the performance analysis hardware counter 202 in the configuration P2.

The collection unit 101 causes the computer to be examined 20 to measure the SPEC CPU int rate, fprate and to record an operation using the performance counter (performance analysis hardware counter 202). The collection unit 101 causes the computer to be examined 20 to execute the following command, for example, as in step A6.

perf record -agruncpu --config=* --reportable intrateruncpu --config=* --reportable fprate The collection unit 101 confirms the presence or absence of an error due to execution of the execution application program and execution of measurement of the memory reservation amount and the memory access amount by the performance analysis hardware counter 202. In the case where there is an error (see "error" route in step A8) as a result of the confirmation, the collection unit 101 again causes the computer to be examined 20 to execute the execution application program and measure the memory reservation amount and the memory access amount by the performance analysis hardware counter 202.

As a result of the confirmation in step A8, the processing proceeds to step A9 in the case where there is no error (refer to "normal end" route in step A8).

In step A9, the collection unit 101 restarts the computer to be examined 20 and changes the memory configuration. Thereby, the collection unit 101 sets the memory configuration of the computer to be examined 20 into the state of the configuration P3.

For example, the analysis server 10 (collection unit 101) changes the memory configuration of the computer to be examined 20 by emulating the BIOS screen of the computer to be examined 20 and changing Enable to Disable or Disable to Enable in the memory configuration menu, similarly to step A7. Thereby, the memory configuration of the computer to be examined 20 is set to the state of the configuration P3.

Furthermore, the collection unit 101 accesses the BMC 208 via the IPMI and restarts the computer to be examined 20 via the BMC 208.

In step A10, the collection unit 101 causes the computer to be examined 20 to execute the execution application program and measure the memory reservation amount and the memory access amount by the performance analysis hardware counter 202 in the configuration P3.

The collection unit 101 causes the computer to be examined 20 to measure the SPEC CPU int rate, fprate and to record an operation using the performance counter (performance analysis hardware counter 202). The collection unit 101 causes the computer to be examined 20 to execute the following command, for example, as in step A6.

perf record -agruncpu --config=* --reportable intrateruncpu --config=* --reportable fprate The collection unit 101 confirms the presence or absence of an error due to execution of the execution application program and execution of measurement of the memory reservation amount and the memory access amount by the performance analysis hardware counter 202. In the case where there is an error (see "error" route in step A10) as a result of the confirmation, the collection unit 101 again causes the computer to be examined 20 to execute the execution application program and measure the memory reservation amount and the memory access amount by the performance analysis hardware counter 202.

In the case where there is no error (see "normal end" route in step A8) as a result of the confirmation in step A10, the collection unit 101 moves to step A11.

In step A11, the analysis unit 105 performs characteristic analysis and performance analysis for the execution application program. Note that details of the processing will be described below with reference to the flowchart illustrated in FIG. 27.

Thereafter, in step A12, the configuration determination unit 106 determines the recommended memory configuration on the basis of the result of the characteristic analysis and the performance analysis, and the presentation unit 107 presents the recommended memory configuration to the user. Thereafter, the processing ends.

Next, processing of the performance analysis and the characteristic analysis in the computer system 1 as an example of an embodiment will be described according to the flowchart (steps B1 to B11) illustrated in FIG. 27. The following processing is performed for each execution application program executed by the computer to be examined 20.

In step B1, the analysis unit 105 refers to the information storage unit 102 and acquires the memory reservation amount and the memory access amount of the execution application program collected by the collection unit 101 for the execution application program.

In step B2, the analysis unit 105 refers to the information storage unit 102 and acquires the change in the performance due to the change in the memory band of the execution application program collected by the collection unit 101.

In step B3, the analysis unit 105 confirms whether or not the ratio of the memory reservation amount to the memory capacity of the execution application program is 50% (first threshold) or more.

In the case where the ratio of the memory reservation amount to the memory capacity is less than 50% (see NO route in step B3) as a result of the confirmation, the processing proceeds to step B8.

In step B8, the analysis unit 105 determines the memory use tendency of the execution application program as the pattern D. The execution application program with the memory use tendency of the pattern D is not suitable for implementation of the DCPMM but cost reduction can be achieved by reducing the DRAM. Thereafter, the processing ends.

In the case where the ratio of the memory reservation amount to the memory capacity is 50% or larger (see YES route in step B3) as a result of the confirmation in step B3, the processing proceeds to step B4.

In step B4, the analysis unit 105 determines whether the memory reservation amount of the execution application program varies. In the case where the memory reservation amount varies (see YES route in step B4) as a result of the confirmation, the processing proceeds to step B9.

In step B9, the analysis unit 105 determines whether the memory access amount of the execution application program varies. In the case where the memory access amount varies (see YES route in step B9) as a result of the confirmation, the processing proceeds to step B10.

In step B10, the analysis unit 105 determines the memory use tendency of the execution application program as the pattern C. The execution application program with the memory use tendency of the pattern C has swapping to the storage device 13 if there is no DCPMM and has a considerable performance degradation possibility. The performance calculation unit 104 calculates the performance degradation occurrence probability from the variation in the access variation amount. Thereafter, the processing ends.

In the case where the memory reservation amount does not vary (see NO route in step B4) as a result of the confirmation in step B4, the processing proceeds to step B5.

In step B5, the analysis unit 105 determines whether the performance of the execution application program is improved by increasing the memory band. In the case where the performance is improved by increasing the memory band (see YES route in step B5) as a result of the confirmation, the processing proceeds to step B9.

Furthermore, in the case where the performance is not improved even by increasing the memory band (see NO route in step B5) as a result of the confirmation in step B5, the processing proceeds to step B6.

In step B6, the analysis unit 105 confirms the memory access amount. Specifically, whether the memory access amount is smaller than the minimum band (40 bGB/sec: second threshold). In the case where the memory access amount is equal to or larger than the minimum band (see NO route in step B6) as a result of the confirmation, the process proceeds to step B11.

In step B11, the analysis unit 105 determines the memory use tendency of the execution application program as the pattern B. The execution application program with the memory use tendency of the pattern B is not suitable for implementation of the DCPMM. Thereafter, the processing ends.

Then, in the case where the memory access amount is smaller than the minimum band (see YES route in step B6) as a result of the confirmation in step B6, the processing proceeds to step B7.

In step B7, the analysis unit 105 determines the memory use tendency of the execution application program as the pattern A. The execution application program with the memory use tendency of the pattern A can achieve cost reduction by mounting the DCPMM to expand the memory. Thereafter, the processing ends.

Next, processing of the presentation unit 107 in the computer system 1 as an example of an embodiment will be described according to the flowchart (steps C1 to C5) illustrated in FIG. 28.

Figure 27:
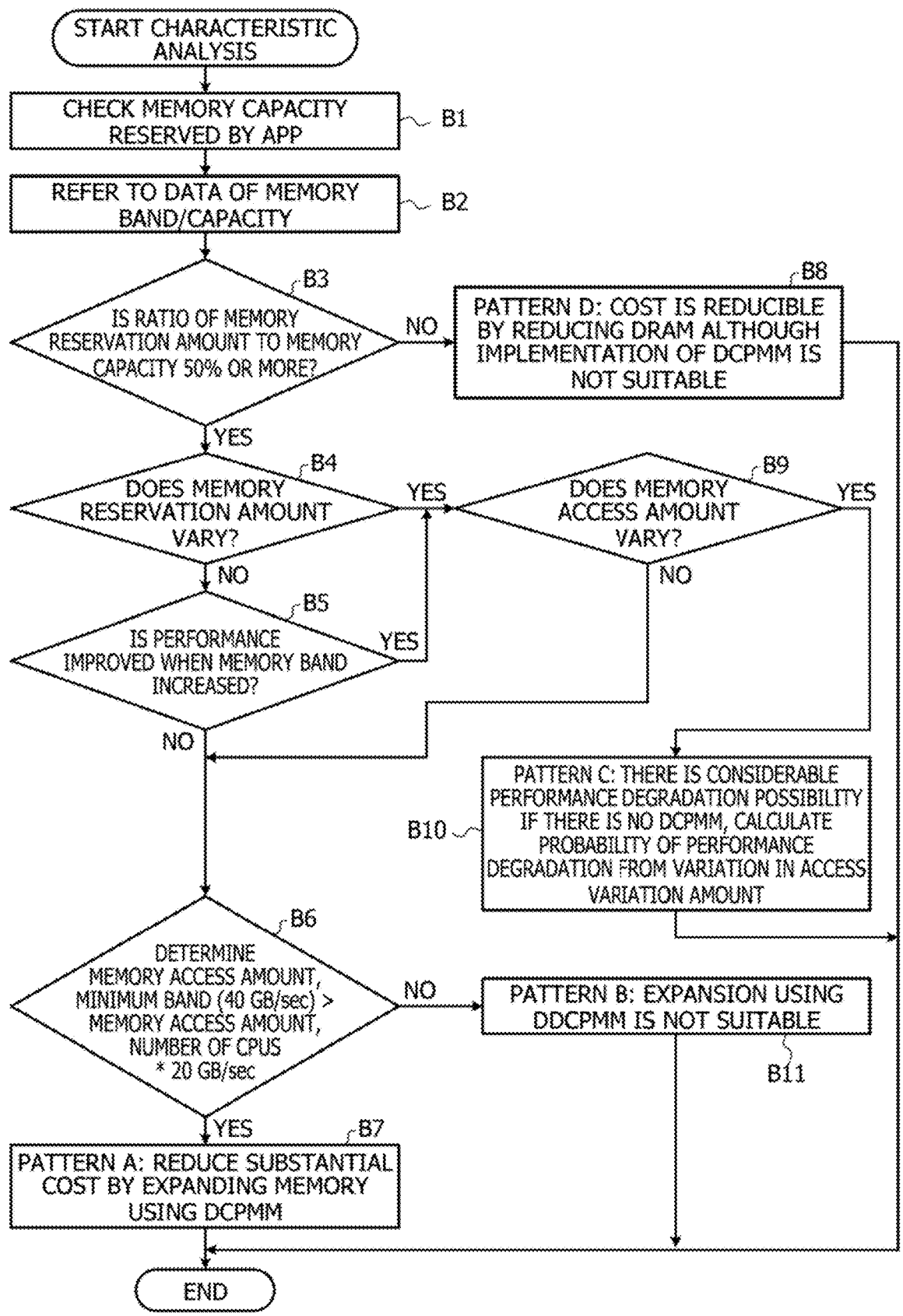
FIG. 27 is a flowchart for describing processing of performance analysis and characteristic analysis in the computer system as an example of the embodiment.

Each of the following processing is performed after the processing illustrated in the flowcharts in FIGS. 25 to 27 is performed for the computer to be examined 20 by the analysis server 10. Furthermore, it is assumed that the user of the computer to be examined 20 can determine which of the ten types of execution application programs AP1 to AP10 the application to be used for practice in the computer to be examined 20 has the memory use tendency close to.

The user selects a classification having the calculation characteristics close to the application executed in the computer to be examined 20 from among the patterns A to D, and the presentation unit 107 presents the memory configuration suitable for the selected pattern.

In step C1, the presentation unit 107 displays, on the monitor 14a, the pattern classifications (A to D) performed by the analysis unit 105 for the execution application program.

The user of the computer to be examined 20 selects, from the patterns A to D, the classification having similar characteristics (memory use tendency) to the customer application 209 executed in the computer to be examined 20.

In step C2, the presentation unit 107 reads, from the information storage unit 102, the pre-change configuration of the computer to be examined 20 and the recommended memory configuration determined by the configuration determination unit 106 for the execution application program in the pattern selected in step C1.

Then, the presentation unit 107 creates the pre-change configuration diagram 141 illustrating the pre-change configuration and the recommended memory configuration diagram 142 illustrating the recommended memory configuration determined by the configuration determination unit 106, and creates the presentation screen 140 by arranging the pre-change configuration diagram 141 and the recommended memory configuration diagram 142 one above the other. The presentation unit 107 displays the created presentation screen 140 on the monitor 14a or the like.

In step C3, the user performs an input operation (for example, button selection of OK, approval, next, or the like) for obtaining further information regarding the recommended memory configuration illustrated on the presentation screen 140. Furthermore, in the case where there is a plurality of recommended memory configurations as in the case of the pattern C illustrated in FIG. 23 and the like, the user may perform an operation to select one recommended memory configuration from among the plurality of recommended memory configurations.

In step C4, the presentation unit 107 creates the performance/cost graph 143 using the performance and cost of the computer to be examined 20 in the recommended memory configuration and the performance and cost of the computer to be examined 20 in the pre-change configuration, which have been calculated by the cost calculation unit 103.

In step C5, the presentation unit 107 displays, on the monitor 14a, the presentation screen 140 including the performance/cost graph 143 created in step C4. The presentation unit 107 may display the pre-change configuration diagram 141 and the recommended memory configuration diagram 142 created in step C2 together with the performance/cost graph 143 on the presentation screen 140. Thereafter, the processing ends.

Figure 28:
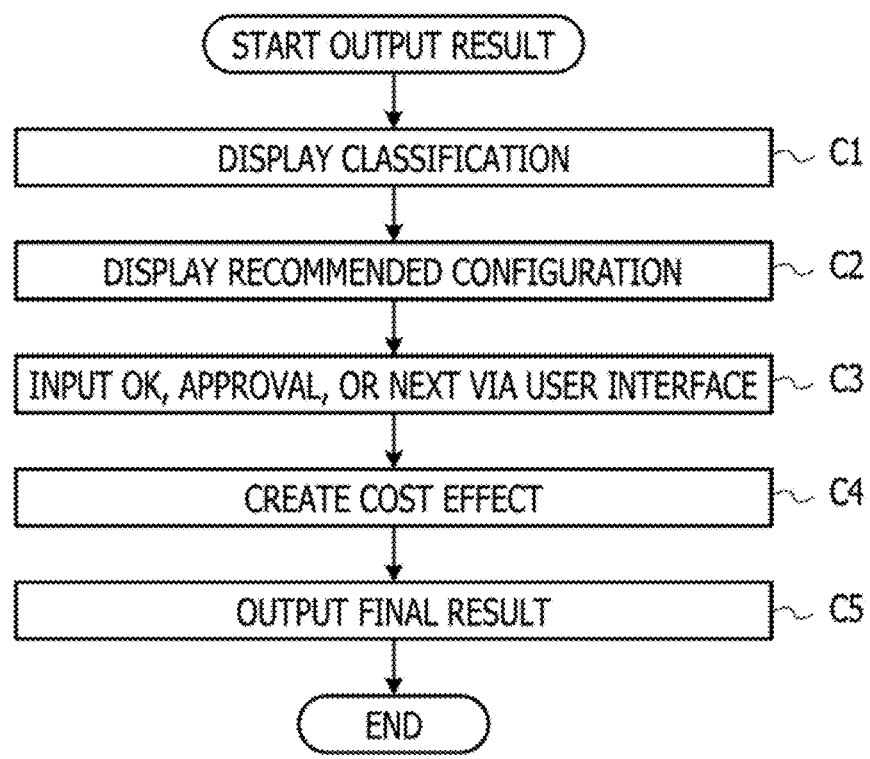
FIG. 28 is a flowchart for describing processing of a presentation unit in the computer system as an example of the embodiment.

Note that the flowchart illustrated in FIG. 28 is not limited thereto and can be appropriately changed and implemented. For example, the input operation by the user illustrated in step C3 may be omitted.

(C) Effect

As described above, according to the computer system 1 as an example of the embodiment, a memory configuration suitable for an application executed in the computer to be examined 20 that functions in the memory mode can be acquired.

That is, in the analysis server 10, the collection unit 101 causes the computer to be examined 20 to execute the benchmark application 201 (execution application program) and execute the performance analysis hardware counter 202 to acquire the memory performance characteristic information (the memory reservation amount and the memory access amount) of the computer to be examined 20.

Furthermore, the collection unit 101 acquires the memory reservation amount and the memory access amount while changing the memory band of the computer to be examined 20.

Then, the analysis unit 105 determines which of the patterns A to D the memory use tendency of the execution application program corresponds to, and the configuration determination unit 106 determines the recommended memory configuration according to the determined pattern. At this time, the configuration determination unit 106 determines the recommended memory configuration having less performance degradation and capable of reducing the cost, as compared with the pre-change configuration.

For example, the configuration determination unit 106 determines a memory configuration in which the memory is secured using the DCPMM and the memory access is covered only by the DRAM as a cache memory, as the recommended memory configuration, for the execution application program in the pattern A.

Furthermore, for the execution application program determined to be the pattern B, the configuration determination unit 106 determines a memory configuration without using the DCPMM and using only the DRAM as the recommended memory configuration.

Moreover, for the execution application program determined to be the pattern C, the configuration determination unit 106 determines a memory configuration using the DCPMM and the DRAM and a memory configuration using only the DRAM as the recommended memory configurations.

Furthermore, the configuration determination unit 106 determines, for the execution application program in the pattern D, a memory configuration obtained by reducing the DRAM having the pre-change configuration in accordance with the maximum memory reservation amount as the recommended memory configuration.

Thereby, the recommended memory configuration having less performance degradation and capable of reducing the cost, as compared with the pre-change configuration, can be easily created.

Then, by selecting the recommended memory configuration in the pattern having the calculation characteristics close to the application (customer application 209) executed in the computer to be examined 20, the memory configuration having less performance degradation and capable of reducing the cost, as compared with the pre-change configuration, and suitable for the computer to be examined 20 can be easily acquired.

Furthermore, the presentation unit 107 presents, to the user, the plurality of recommended memory configurations including the memory configuration using the DCPMM and the DRAM and the memory configuration using only the DRAM, which have been determined by the configuration determination unit 106 for the execution application program determined to be the pattern C, to prompt the user to select a memory configuration. Thereby, the computer to be examined 20 can be set to have the memory configuration reflecting the intention of the user.

The collection unit 101 uses the known benchmark application as the benchmark application 201 to be executed by the computer to be examined 20, so that the execution application program having the memory use tendency close to the customer application 209 can be efficiently prepared.

(D) Others

Figure 29:
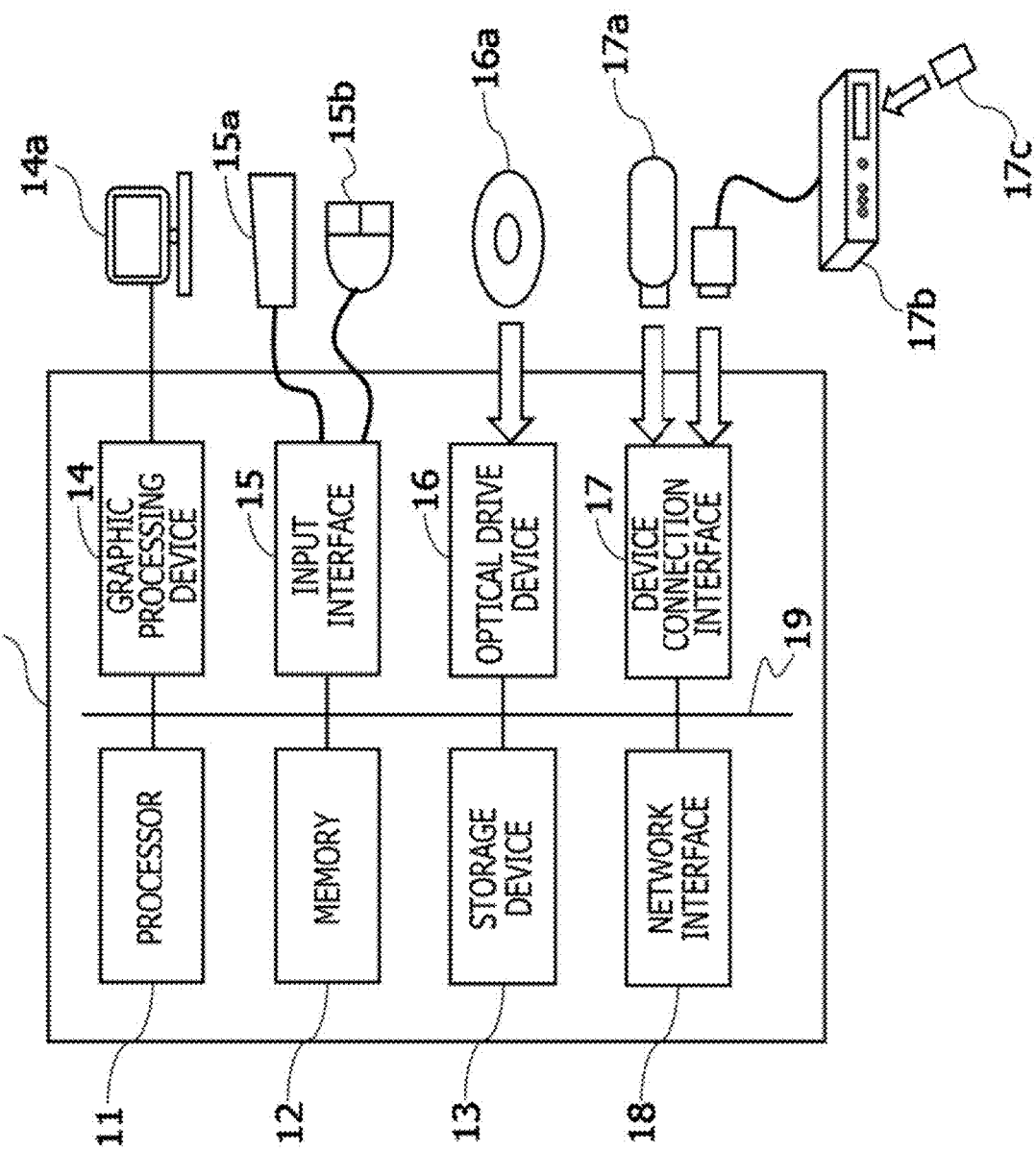
FIG. 29 is a diagram illustrating a hardware configuration of an analysis server of the computer system as an example of an embodiment.

FIG. 29 is a diagram illustrating a hardware configuration of the analysis server 10 of the computer system 1 as an example of an embodiment.

The analysis server 10 includes, for example, a processor 11, the memory 12, the storage device 13, a graphic processing device 14, an input interface 15, an optical drive device 16, a device connection interface 17, and a network interface 18 as constituent elements. These constituent elements 11 to 18 are configured to be able to communicate with one another via a bus 19.

The processor (processing unit) 11 controls the entire analysis server 10. The processor 11 may be a multiprocessor. The processor 11 may be, for example, any one of a CPU, a micro processing unit (MPU), a digital signal processor (DSP), an application specific integrated circuit (ASIC), a programmable logic device (PLD), and a field programmable gate array (FPGA). Furthermore, the processor 11 may be a combination of two or more types of elements of the CPU, MPU, DSP, ASIC, PLD, and FPGA.

The memory 12 is a storage memory including a ROM and a RAM. The RAM of the memory 12 is used as a main storage device of the analysis server 10. The RAM temporarily stores at least part of the OS and the application programs to be executed by the processor 11. Furthermore, the RAM further stores various data needed for the processing by the processor 11. The application program may include a hardware configuration presentation program (analysis program) to be executed by the processor 11 to implement a radiated electromagnetic wave estimation function of the present embodiment by the analysis server 10. The memory 12 may function as the information storage unit 102 illustrated in FIG. 1.

The storage device 13 is a storage device such as a hard disk drive (HDD), a solid state drive (SSD), or a storage class memory (SCM), and stores various data. The storage device 13 is used as an auxiliary storage device of the analysis server 10. The storage device 13 stores the OS, the hardware configuration presentation program (analysis program), and various data. Note that a semiconductor storage device such as an SCM or a flash memory can be used as the auxiliary storage device. The storage device 13 may function as the information storage unit 102 illustrated in FIG. 1.

The graphic processing device 14 is connected to a monitor 14a. The graphic processing device 14 displays an image on a screen of the monitor 14a according to a command from the processor 11. Examples of the monitor 14a include a display device using a cathode ray tube (CRT), a liquid crystal display device, or the like.

The input interface 15 is connected to a keyboard 15a and a mouse 15b. The input interface 15 transmits signals transmitted from the keyboard 15a and the mouse 15b to the processor 11. Note that, the mouse 15b is an example of a pointing device, and another pointing device can also be used. Examples of the another pointing device include a touch panel, a tablet, a touch pad, a track ball, or the like.

The optical drive device 16 reads data recorded on an optical disc 26a using laser light or the like. The optical disc 16a is a non-transitory portable recording medium having data recorded in a readable manner by reflection of light. Examples of the optical disc 16a include a digital versatile disc (DVD), a DVD-RAM, a compact disc read only memory (CD-ROM), a CD-recordable (R)/rewritable (RW), or the like.

The device connection interface 17 is a communication interface for connecting peripheral devices to the analysis server 10. For example, the device connection interface 17 can be connected to a memory device 17a and a memory reader/writer 17b. The memory device 17a is a non-transitory recording medium having a communication function with the device connection interface 17, and is, for example, a universal serial bus (USB) memory. The memory reader/writer 17b writes data to a memory card 17c or reads data from the memory card 17c. The memory card 17c is a card-type non-transitory recording medium.

The network interface 18 is connected to a network (not illustrated). The network interface 18 transmits/receives data to/from other computers or communication devices such as the computer to be examined 20 and an auxiliary computer 20a (see FIG. 30) to be described below via the network.

In the analysis server 10 having the hardware configuration as described above, the processor 11 executes the hardware configuration presentation program, thereby implementing the functions as the collection unit 101, the cost calculation unit 103, the performance calculation unit 104, and the analysis unit 105.

Note that the program (hardware configuration presentation program) for implementing the functions of the collection unit 101, the cost calculation unit 103, the performance calculation unit 104, and the analysis unit 105 is provided in a form of being recorded in a computer-readable recording medium such as a flexible disk, a CD (CD-ROM, CD-R, CD-RW, or the like), a DVD (DVD-ROM, DVD-RAM, DVD-R, DVD+R, DVD-RW, DVD+RW, HD DVD, or the like), a Blu-ray disc, a magnetic disc, an optical disc, or a magneto-optical disc. Then, the computer reads the program from the recording medium, transfers the program to an internal storage device or an external storage device, and stores the program for use. Furthermore, the program may be recorded in a storage device (recording medium) such as a magnetic disc, an optical disc, or a magneto-optical disc, and provided from the storage device to the computer via a communication path.

In implementing the functions as the collection unit 101, the cost calculation unit 103, the performance calculation unit 104, and the analysis unit 105, the program stored in the internal storage device (the RAM or the ROM of the memory 12 in the present embodiment) is executed by the microprocessor (the processor 11 in the present embodiment) of the computer. At this time, the computer may read and execute the program recorded in the recording medium.

Then, the disclosed technology is not limited to the above-described embodiment, and various modifications can be made and implemented without departing from the scope of the present embodiment. Each of the configurations and processes of the present embodiment can be selected or omitted as needed or may be appropriately combined.

For example, in the above-described embodiment, the collection unit 101 executes the benchmark application 201 on the computer to be examined 20, but the embodiment is not limited thereto.

Figure 30:
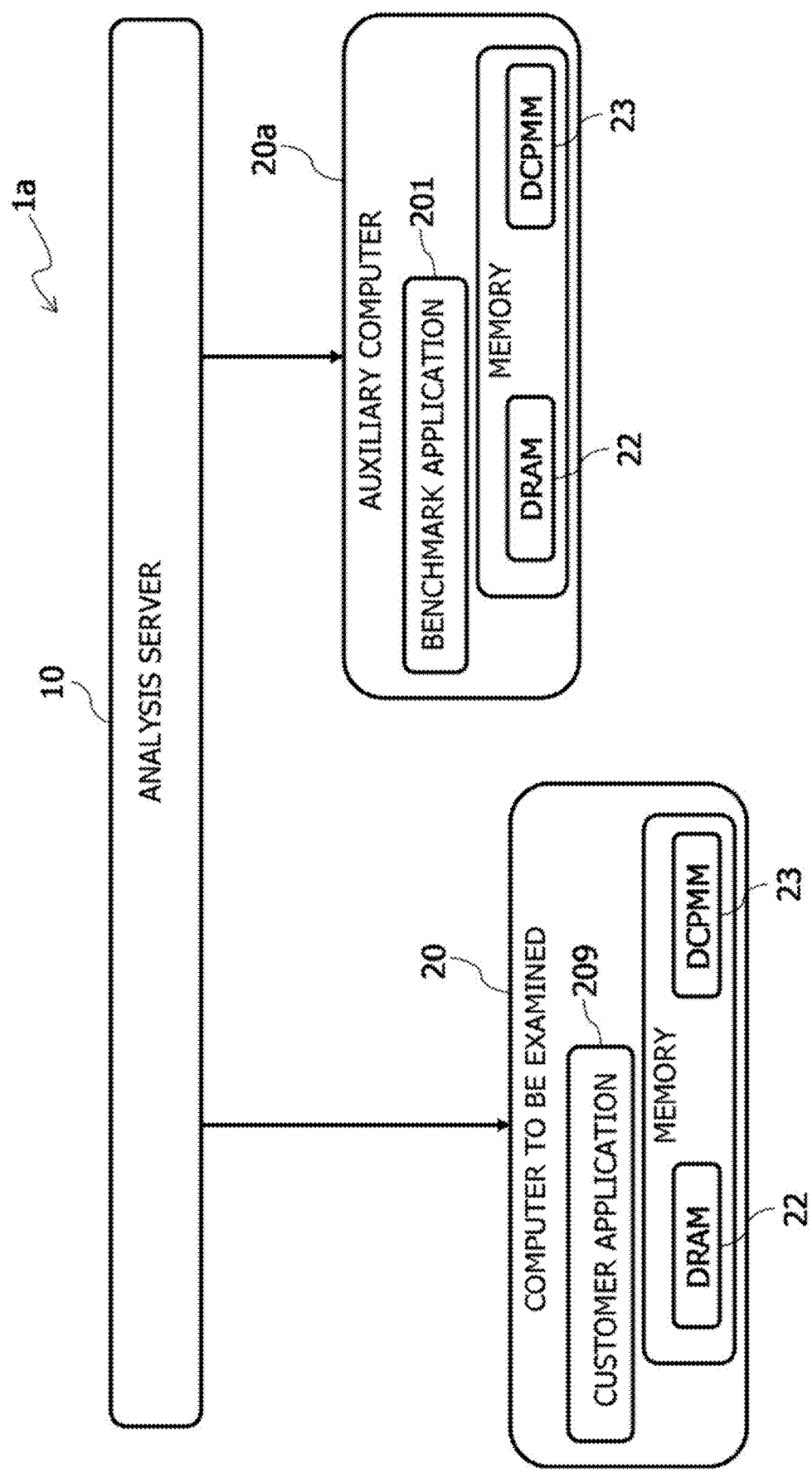
FIG. 30 is a diagram illustrating a configuration of a computer system as a modification of the embodiment.

FIG. 30 is a diagram illustrating a configuration of a computer system 1a as a modification of the embodiment.

The computer system 1a illustrated in FIG. 30 includes the auxiliary computer 20a in addition to the computer system 1 illustrated in FIG. 1.

The auxiliary computer 20a is a computer having a hardware configuration similar to the computer to be examined 20. In the present computer system 1a, the benchmark application 201 is executed in the auxiliary computer 20a instead of the computer to be examined 20.

That is, in the present computer system 1a, the collection unit 101 causes the auxiliary computer 20a to execute the benchmark application 201 (execution application program).

Then, the analysis unit 105 performs the characteristic analysis and the performance analysis on the basis of the memory performance characteristic information that the collection unit 101 causes the auxiliary computer 20a to execute and collect. The configuration determination unit 106 determines the recommended memory configuration according to each execution application program on the basis of the information collected and created for the auxiliary computer 20a. Moreover, the cost calculation unit 103 and the performance calculation unit 104 perform the cost calculation and the performance calculation on the basis of the information collected and created for the auxiliary computer 20a.

Then, the user of the computer to be examined 20 selects, from the patterns A to D, the classification having similar characteristics (memory use tendency) to the customer application 209 executed in the computer to be examined 20.

Thereby, the user of the computer to be examined 20 can obtain the recommended memory configuration suitable for the customer application 209. At this time, since there is no need to execute the benchmark application 201 (execution application program) in the computer to be examined 20, the operation performed in the computer to be examined 20 is not affected.

Furthermore, in the above-described embodiment and modifications, the application to be evaluated 209 may be executed to finely tune the computer to be examined 20 whose configuration has been changed to have the recommended memory configuration.

In the above-described embodiment and modifications, an example in which the computer to be examined 20 includes the two CPUs 301 has been described. However, the embodiment is not limited thereto, and three or more CPUs may be included. Furthermore, in the above-described embodiment and modifications, the CPU 301 includes the two IMCs 304. However, the embodiment is not limited thereto, The CPU 301 may include one or three or more IMCs 304. Furthermore, two or less or four or more channels may be connected to the IMC 304.

The computer to be examined 20 may execute two or more types of customer applications 209. The analysis server 10 may present the recommended memory configuration to each of these two or more types of customer applications 209, and the user may select one from among the presented recommended memory configurations and apply the one.

Furthermore, the present embodiment can be implemented and manufactured by those skilled in the art according to the above-described disclosure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An analysis device configured to be connected to an information processing apparatus in a communicative manner, the information processing apparatus being configured to mount a first memory and a low-speed second memory, the low-speed second memory being cheaper and having lower performance than the first memory and being used for memory capacity expansion, the analysis device comprising:
    a memory; and
    a processor coupled to the memory, the processor being configured to perform program instructions, the program instructions including:
    causing the information processing apparatus to
        execute a plurality of types of performance evaluation application programs, and
        acquire, from the information processing apparatus, memory performance characteristic information regarding each performance evaluation application program, the memory performance characteristic information including a memory reservation amount and a memory access amount measured in the information processing apparatus executing that performance evaluation application program;
    determining a recommended memory configuration according to the performance evaluation application program corresponding to the application to be evaluated program among the plurality of types of performance evaluation application programs by using a collection result of the memory performance characteristic information; and
    outputting recommended memory configuration information indicating the recommended memory configuration to an output destination,
    the determining of the recommended memory configuration including:
        obtaining a first determination result by determining whether the memory reservation amount indicated by the memory performance characteristic information acquired for the performance evaluation application program corresponding to the application to be evaluated program is greater than a first threshold;
        obtaining a second determination result by determining whether the memory access amount indicated by the memory performance characteristic information acquired for the performance evaluation application program corresponding to the application to be evaluated program is greater than a second threshold; and
        generating the recommended memory configuration by using the first determination result and the second determination result.

2. The analysis device according to any one of claim 1, wherein the performance evaluation application program is a benchmark application provided with a plurality of execution application programs.

3. The analysis device according to claim 1, wherein the memory performance characteristic information includes information regarding a change in performance in a case of changing each of a memory reservation amount, a memory access amount, and a memory band.

4. The analysis device according to claim 3, wherein the configuration determination unit determines a configuration including the first memory of a capacity sufficient to satisfy the memory access amount and the second memory of a capacity that satisfies the memory reservation amount as the recommended memory configuration in a case where the memory reservation amount by the performance evaluation application program is equal to or larger than a first threshold and the memory access amount is smaller than a second threshold, and the performance is not improved even when the memory band is increased in the memory performance characteristic information.

5. The analysis device according to claim 3, wherein the configuration determination unit determines a configuration not including the first memory as the recommended memory configuration in a case where the memory reservation amount by the performance evaluation application program is equal to or larger than a first threshold and the memory access amount is equal to or larger than a second threshold, and the performance is not improved even when the memory band is increased in the memory performance characteristic information.

6. The analysis device according to claim 3, wherein the configuration determination unit determines a first recommended memory configuration including only the first memory and a second recommended memory configuration including the first memory and the second memory in a case where the memory reservation amount by the performance evaluation application program is equal to or larger than a first threshold, and the memory access amount and the memory reservation amount vary in the memory performance characteristic information.

7. A non-transitory computer-readable storage medium for storing an analysis program which causes a processor of an analysis device to perform processing, the analysis device being configured to be able to mount a first memory and a second memory, the second memory being cheaper and having lower performance than the first memory and being used for memory capacity expansion, the analysis device being configured to be connected to an information processing apparatus that executes an application to be evaluated program in a communicative manner, the processing comprising:
    causing the information processing apparatus to
        execute a plurality of types of performance evaluation application programs, and
        acquire, from the information processing apparatus, memory performance characteristic information regarding each performance evaluation application program, the memory performance characteristic information including a memory reservation amount and a memory access amount measured in the information processing apparatus executing that performance evaluation application program;
    determining a recommended memory configuration according to the performance evaluation application program corresponding to the application to be evaluated program among the plurality of types of performance evaluation application programs by using a collection result of the memory performance characteristic information; and
    outputting recommended memory configuration information indicating the recommended memory configuration to an output destination,
    the determining of the recommended memory configuration including:

obtaining a first determination result by determining whether the memory reservation amount indicated by the memory performance characteristic information acquired for the performance evaluation application program corresponding to the application to be evaluated program is greater than a first threshold;

obtaining a second determination result by determining whether the memory access amount indicated by the memory performance characteristic information acquired for the performance evaluation application program corresponding to the application to be evaluated program is greater than a second threshold; and generating the recommended memory configuration by using the first determination result and the second determination result.

8. A computer system comprising:

an analysis device; and an information processing apparatus, the information processing apparatus being configured to mount a first memory and a low-speed second memory, the low-speed second memory being cheaper and having lower performance than the first memory and being used for memory capacity expansion, the analysis device being configured to be connected to the information processing apparatus in a communicative manner, the analysis device being configured to execute computer instructions including:

causing the information processing apparatus to execute a plurality of types of performance evaluation application programs, and acquire, from the information processing apparatus, memory performance characteristic information regarding each performance evaluation application program, the memory performance characteristic information including a memory reservation amount and a memory access amount measured in the information processing apparatus executing that performance evaluation application program;

determining a recommended memory configuration according to the performance evaluation application program corresponding to the application to be evaluated program among the plurality of types of performance evaluation application programs by using a collection result of the memory performance characteristic information; and outputting recommended memory configuration information indicating the recommended memory configuration to an output destination, the determining of the recommended memory configuration including:

obtaining a first determination result by determining whether the memory reservation amount indicated by the memory performance characteristic information acquired for the performance evaluation application program corresponding to the application to be evaluated program is greater than a first threshold;

obtaining a second determination result by determining whether the memory access amount indicated by the memory performance characteristic information acquired for the performance evaluation application program corresponding to the application to be evaluated program is greater than a second threshold; and generating the recommended memory configuration by using the first determination result and the second determination result.

* * * * *